US012470872B2

(12) United States Patent
Starobin

(10) Patent No.: US 12,470,872 B2
(45) Date of Patent: Nov. 11, 2025

(54) LOUDSPEAKER SYSTEMS

(71) Applicant: Sound United, LLC, Carlsbad, CA (US)

(72) Inventor: Bradley M. Starobin, Baltimore, MD (US)

(73) Assignee: Sound United, LLC, Carlsbad, CA (US)

( * ) Notice: Subject to any disclaimer, the term of this patent is extended or adjusted under 35 U.S.C. 154(b) by 75 days.

(21) Appl. No.: 18/103,446

(22) Filed: Jan. 30, 2023

(65) Prior Publication Data

US 2023/0319478 A1 Oct. 5, 2023

Related U.S. Application Data

(60) Provisional application No. 63/305,055, filed on Jan. 31, 2022.

(51) Int. Cl.

| | |
|---|---|
| ***H04R 5/04*** | (2006.01) |
| ***H04R 3/12*** | (2006.01) |
| ***H04R 5/02*** | (2006.01) |
| ***H04S 3/00*** | (2006.01) |

(52) U.S. Cl.

CPC ................. *H04R 5/04* (2013.01); *H04R 3/12* (2013.01); *H04R 5/02* (2013.01); *H04S 3/008* (2013.01); *H04S 2400/01* (2013.01)

(58) Field of Classification Search

CPC .... H04R 5/04; H04R 3/12; H04R 5/02; H04S 3/008; H04S 2400/01

USPC .......................... 381/300, 1, 58, 59, 56, 307

See application file for complete search history.

(56) References Cited

U.S. PATENT DOCUMENTS

| | | | | |
|---|---|---|---|---|
| 4,489,432 A | | 12/1984 | Polk | |
| 4,497,064 A | | 1/1985 | Polk | |
| 4,569,074 A | | 2/1986 | Polk | |
| 4,594,729 A | | 6/1986 | Weingartner | |
| 4,638,505 A | | 1/1987 | Polk et al. | |
| 4,759,066 A | | 7/1988 | Polk et al. | |
| 4,888,804 A | * | 12/1989 | Gefvert .................... | H04R 1/26 381/304 |

(Continued)

OTHER PUBLICATIONS

Tortosa, et al.: "Acoustic Positioning System for 3D Localization of Sound Sources Based on the Time of Arrival of a Signal for a Low-Cost System," Eng. Proc. 2021, 10(1), 15. Published Nov. 1, 2021.

*Primary Examiner* — Thjuan K Addy

(74) *Attorney, Agent, or Firm* — Knobbe, Martens, Olson & Bear, LLP

(57) ABSTRACT

A single enclosure multi-channel loudspeaker product 500 can use a transducer arrangement and signal processing system and method to generate the Stereo Dimensional Array ("SDA") effect (with effective interaural crosstalk cancelation (IACC)) including the generation of four distinct projections of sound in a listener's space from only three mid-bass drivers (e.g. 508L, 508C and 508R). The system and method of the present disclosure are configurable in a very compact soundbar 500 whose transducer arrangement permits reduced size and reduced driver count by employing a single center channel mid-bass transducer 508C with signal processing permitting reproduction of the two (L and R) channels associated with stereo or the multiple (e.g., 5.1.2) channels of home-theater audio bitstreams.

25 Claims, 19 Drawing Sheets

(56) References Cited

U.S. PATENT DOCUMENTS

| | | | |
|---|---|---|---|
| 5,553,149 | A | 9/1996 | Freadman |
| 6,490,359 | B1 | 12/2002 | Gibson |
| 6,937,737 | B2 | 8/2005 | Polk, Jr. |
| 7,231,053 | B2 | 6/2007 | Polk, Jr. |
| 7,817,812 | B2 | 10/2010 | Polk, Jr. et al. |
| 9,185,490 | B2 | 11/2015 | Starobin |
| 9,226,091 | B2 | 12/2015 | Lyons et al. |
| 9,374,640 | B2 | 6/2016 | Starobin |
| 10,070,244 | B1 | 9/2018 | Dabney |
| 10,327,064 | B2 | 6/2019 | Starobin |
| 10,327,086 | B2 | 6/2019 | Orth et al. |
| 11,937,066 | B2 | 3/2024 | Starobin et al. |
| 12,120,494 | B2 | 10/2024 | Orth |
| 2006/0170778 | A1 | 8/2006 | Ely et al. |
| 2009/0123007 | A1 | 5/2009 | Katayama |
| 2009/0175476 | A1 | 7/2009 | Bottum |
| 2011/0216925 | A1* | 9/2011 | Riggs .................... H04R 1/323 381/300 |
| 2015/0016642 | A1 | 1/2015 | Walsh et al. |
| 2016/0149547 | A1 | 5/2016 | Rider et al. |
| 2016/0286167 | A1 | 9/2016 | Clavel et al. |
| 2020/0221240 | A1 | 7/2020 | Pye et al. |
| 2020/0401369 | A1 | 12/2020 | Sabin et al. |

* cited by examiner

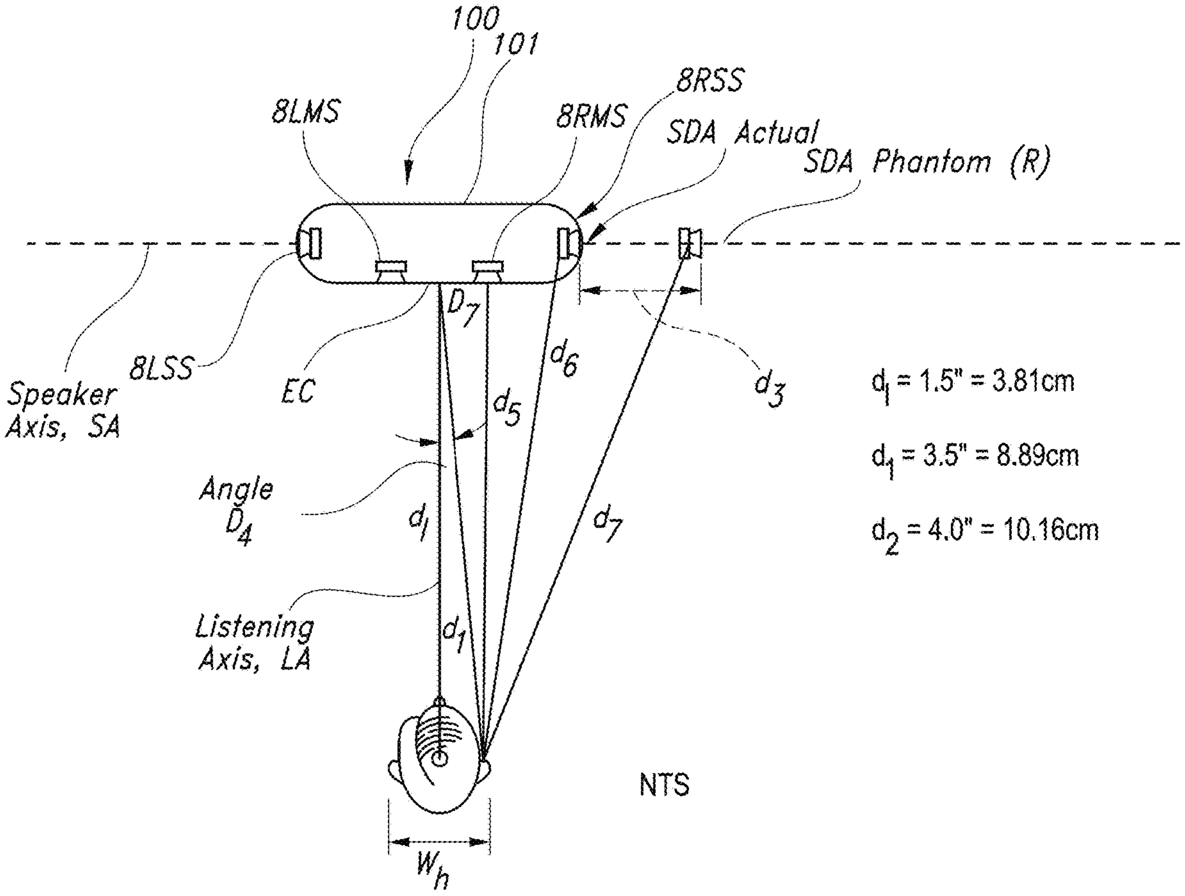

$d_l$ = 1.5" = 3.81cm $d_1$ = 3.5" = 8.89cm $d_2$ = 4.0" = 10.16cm $d_l$ = listening distance as shown $d_1$ = distance between center of loudspeaker & "main" transducer of main/SDA pair $d_2$ = distance between acoustic center of main transducer & its SDA counterpart (actual position)

$d_3$ = distance between acoustic centers of actual and ideal (phantom) SDA transducers $d_4$ = distance from right ear to loudspeaker $d_5$, $d_6$, $d_7$ = distance between listener (right ear) & acoustic center of main (d5), actual SDA (d6) & phantom SDA (d7) transducer $W_h$ = width of human head (distance between ears)

FIG. 1C

Notes:
1: Left & Right (front) channels are processed per stereo SDA algorithm
2: Center channel processing (HPF, PEQ, LPF) is immaterial to patent & not shown;
in accordance with patent 9,374,640 (Starobin) all transducers reproduce center channel program metrics as a line array Acoustic SDA (aSDA) simplified to include only essential elements Not shown: Cntr Mid bass driver also plays center ch (discrete or derived) in addition to L + R signal in aSDA embodiment

LOUDSPEAKER SYSTEMS

CROSS-REFERENCE TO RELATED APPLICATIONS

This application claims the priority benefit of U.S. Provisional Patent Application No. 63/305,055, entitled "Method for implementing Stereo Dimensional Array Sound Projections from novel Transducer Array, Signal Processing Method and Compact Single Enclosure Active Loudspeaker System," which was filed on Jan. 31, 2022, the entire disclosure of which is incorporated herein by reference.

Aspects of the subject matter of this disclosure are also related to the following: (a) U.S. patent application Ser. No. 15/796,303, now U.S. Pat. No. 10,327,064, entitled "Method and System for implementing Stereo Dimensional Array signal processing in a Compact Single Enclosure Active Loudspeaker Product," and (b) U.S. patent application Ser. No. 14/563,508, now U.S. Pat. No. 9,374,640, entitled "Method and System for Optimizing Center Channel Performance in a Single Enclosure Multi-Element Loudspeaker Line Array," the entire disclosures of which are incorporated herein by reference.

Aspects of the subject matter of this disclosure are also related to the following applications: Ser. No. 06/383,151, now U.S. Pat. No. 4,489,432; Ser. No. 06/405,341, now U.S. Pat. No. 4,497,064; Ser. No. 06/616,249, now U.S. Pat. No. 4,569,074; Ser. No. 10/692,692, now U.S. Pat. No. 6,937,737; Ser. No. 11/147,447, now U.S. Pat. No. 7,231,053; and Ser. No. 13/295,972, now U.S. Pat. No. 9,185,490, the entire disclosures of which are incorporated herein by reference.

BACKGROUND

Field of the Disclosure

The present disclosure relates to reproduction of sound, such as in multichannel systems generally known as "surround-sound" or "stereo" systems, and more specifically to improvements in the application of psychoacoustic and acoustic principles such as in the design of a multi-driver, compact loudspeaker system configured to be located in front of a listening space.

Description of the Related Art

Listeners often use two channel "stereo systems" for music recording playback and "surround-sound" or "home theater" systems for both music playback and other types of audio reproduction.

Surround-sound or home theater loudspeaker systems can be configured for use with home theater audio systems which include a plurality of playback channels, each typically served by an amplifier and a loudspeaker. In Dolby™ or DTS™ home theater audio playback systems (e.g., Dolby Digital ("DD") 5.1, Dolby Atmos or DTS-X, including 5.1.2 or 5.1.4), there can be five or more channels of substantially full range material plus a subwoofer channel configured to reproduce band-limited low frequency material. The five substantially full range channels in a Dolby Digital 5.1™ system are typically, center ("C"), front left ("FL"), front right ("FR"), left surround ("LS") and right surround ("RS"). The front left and front right channel loudspeakers can be positioned in a home theater system near the left and right sides of the video monitor or television and the left front and right front channels are used by content creators for "stereo" (e.g., music) signals and sound effects. For stereo music reproduction, this has the desirable effect of making reproduced music sound as if it emanates from a soundstage which includes the video monitor. For sound effects too, this has the desirable effect of making effects sound as if they emanate from and beyond the video monitor.

When typical surround sound (e.g., DD 5.1) loudspeaker systems are installed in listener's homes, setup problems are sometimes encountered and many users struggle with speaker placement, component connections and related complications. In response, many listeners have turned to "soundbar" style home theater loudspeaker systems which incorporate at least left, center and right channels into a single enclosure configured for use near the user's video display.

These soundbar style single enclosure loudspeaker systems ("soundbars") can be simpler to install and connect, as compared to multi-speaker systems, and can be configured as compact, active loudspeaker products for use almost anywhere. But many soundbars, and especially many compact soundbars provide unsatisfactory performance, such as for listeners who want to listen to movies and music from listening positions arrayed in a listening space. One objection that can be encountered when listening to compact active loudspeaker systems is that the breadth, or width, of the acoustic image delivered by a compact stereo (two-channel) source is small or narrow, so there is no sense of a spacious acoustic image which may be enjoyed by listeners in various listening locations, or even in a limited "sweet spot". In some cases, if anything like an acoustic image is perceived by a listener, that acoustic image is not "stable" in the sense that images presented by the system appear to remain relatively fixed in space even as the listener moves about the listening area.

There is a need for improved loudspeaker systems, such as compact loudspeaker systems, and signal processing methods for reproducing audio program material such as with satisfyingly broad, wide, and/or stable acoustic images, such as for listeners arrayed within a listening space, regardless of each listener's location relative to the loudspeaker within the listening space. There is also a need to provide such loudspeaker system products as economically as possible.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

Various aspects of the present disclose can relate to a loudspeaker system, which can include a left transducer, a middle transducer (e.g., where the left transducer can be offset from the middle transducer in a left direction substantially perpendicular to a longitudinal axis of the middle transducer), and a right transducer (e.g., where the right transducer can be offset from the middle transducer in a right direction substantially opposite the left direction). The system can include signal processing electronics, which can be configured to receive a left audio signal, receive a right audio signal, generate a left crosstalk cancelation signal (e.g., the left crosstalk cancelation signal including an inverted instance of the left audio signal), generate a right crosstalk cancelation signal (e.g., the right crosstalk cancelation signal comprising an inverted instance of the right audio signal), drive the left transducer based at least in part on the right crosstalk cancelation signal, drive the middle transducer based at least in part on the left audio signal and the right audio signal (e.g., at frequencies above about 600 Hz), and drive the right transducer based at least in part on the left crosstalk cancelation signal.

The signal processing electronics can be configured to drive the left transducer to produce sound that is configured to at least partially cancel sound from the middle transducer associated with the right audio signal (e.g., at a listener's left ear), and to drive the right transducer to produce sound that is configured to at least partially cancel sound from the middle transducer associated with the left audio signal (e.g., at the listener's right ear).

The signal processing electronics can be configured to receive a center audio signal and drive the middle transducer based at least in part on center audio signal in addition to the left audio signal and the right audio signal. The signal processing electronics can be configured to drive the left transducer based at least in part on the left audio signal and the right crosstalk cancelation signal and to drive the right transducer based at least in part on the right audio signal and the left crosstalk cancelation signal. The signal processing electronics can be configured to provide the left crosstalk cancelation signal with a first time delay relative to the left audio signal and to provide the right crosstalk cancelation signal with a second time delay relative to the right audio signal. The first time delay and the second time delay can have a duration between about 0.1 ms and about 0.3 ms, in some embodiments.

The signal processing electronics can be configured to drive the left transducer, the middle transducer, and the right transducer so as to produce sound at a listening location that is configured to be perceived by a listener as coming from a phantom sound source at a location that is spaced apart from the left transducer, the middle transducer, and the right transducer. The signal processing electronics can be configured to generate a second-order left crosstalk cancelation signal that comprises an inverted instance of the left crosstalk cancelation signal, generate a second-order right crosstalk cancelation signal that comprises an inverted instance of the right crosstalk cancelation signal, drive the left transducer based at least in part on the right crosstalk cancelation signal and the second-order left crosstalk cancelation signal, and drive the right transducer based at least in part on the left crosstalk cancelation signal and the second-order right crosstalk cancelation signal.

The loudspeaker system can include a soundbar with a housing, and the left transducer, the middle transducer, and the right transducer can be contained within the housing of the soundbar.

Various aspects of the present disclose can relate to a loudspeaker system, which can include a left transducer, a right transducer, and signal processing electronics, which can be configured to receive a left audio signal, receive a right audio signal, generate a left crosstalk cancelation signal (e.g., the left crosstalk cancelation signal comprising an inverted and time delayed instance of the left audio signal), generate a right crosstalk cancelation signal (e.g, the right crosstalk cancelation signal comprising an inverted and time delayed instance of the right audio signal), drive the left transducer based at least in part on the left audio signal and the right crosstalk cancelation signal, and drive the right transducer based at least in part on the right audio signal and the left crosstalk cancelation signal.

The signal processing electronics can be configured to drive the left transducer to produce sound that is configured to at least partially cancel sound from the right transducer associated with the right audio signal at a listener's left ear and to drive the right transducer to produce sound that is configured to at least partially cancel sound from the left transducer associated with the left audio signal at the listener's right ear. The signal processing electronics can be configured to driver the drive the left transducer based at least in part on the left audio signal and the right crosstalk cancelation signal and to drive the right transducer based at least in part on the right audio signal and the left crosstalk cancelation signal at frequencies above about 600 Hz.

The loudspeaker system can include a middle transducer positioned between (e.g., directly between) the left transducer and the right transducer. The signal processing electronics can be configured to receive a center audio signal and to drive the middle transducer based at least in part on center audio signal. The left crosstalk cancelation signal and the right crosstalk cancelation signal can have a time delay that is between about 0.1 ms and about 0.3 ms.

The signal processing electronics can be configured to drive the left transducer and the right transducer so as to produce sound at a listening location that is configured to be perceived by a listener as coming from a phantom sound source at a location that is spaced apart from the left transducer and the right transducer. The signal processing electronics can be configured to generate a second-order left crosstalk cancelation signal (e.g., which can include comprises an inverted instance of the left crosstalk cancelation signal), generate a second-order right crosstalk cancelation signal (e.g., which can include an inverted instance of the right crosstalk cancelation signal), drive the left transducer based at least in part on the right crosstalk cancelation signal and the second-order left crosstalk cancelation signal, and drive the right transducer based at least in part on the left crosstalk cancelation signal and the second-order right crosstalk cancelation signal.

The loudspeaker system can include a soundbar with a housing, and the left transducer and the right transducer can be contained within the housing of the soundbar.

Various aspects of the present disclose can relate to a loudspeaker system, which can include a left transducer, a right transducer, and signal processing electronics configured to receive a left audio signal, receive a right audio signal, generate a left crosstalk cancelation signal (e.g., the left crosstalk cancelation signal can include an inverted and time delayed instance of the left audio signal), generate a right crosstalk cancelation signal (e.g., the right crosstalk cancelation signal can include an inverted and time delayed instance of the right audio signal), generate a second-order left crosstalk cancelation signal that comprises an inverted instance of the left crosstalk cancelation signal, generate a second-order right crosstalk cancelation signal that comprises an inverted instance of the right crosstalk cancelation signal, drive the left transducer based at least in part on the right crosstalk cancelation signal and the second-order left crosstalk cancelation signal, and drive the right transducer based at least in part on the left crosstalk cancelation signal and the second-order right crosstalk cancelation signal.

The signal processing electronics can be configured to provide the second-order left crosstalk cancelation signal with a first time delay relative to the left crosstalk cancelation signal and to provide the second-order right crosstalk cancelation signal with a second time delay relative to the right crosstalk cancelation signal. The first time delay and the second time delay have a duration between about 0.1 ms and about 0.3 ms. The signal processing electronics can be configured to drive the left transducer based at least in part on the left audio signal, the right crosstalk cancelation signal, and the second-order left crosstalk cancelation signal and to drive the right transducer based at least in part on the right audio signal, the left crosstalk cancelation signal, and the second-order right crosstalk cancelation signal.

The loudspeaker system can include a middle transducer positioned between (e.g., directly between) the left transducer and the right transducer. The signal processing electronics can be configured to drive the middle transducer based at least in part on the left audio signal, the right audio signal, and the center audio signal (e.g., at frequencies above about 600 Hz).

The signal processing electronics can be configured to drive the left transducer and the right transducer so as to produce sound at a listening location that is configured to be perceived by a listener as coming from a phantom sound source at a location that is spaced apart from the left transducer and the right transducer.

The loudspeaker system can include a soundbar with a housing, and the left transducer and the right transducer can be contained within the housing of the soundbar.

Various aspects of the present disclose can relate to a Loudspeaker System (e.g., 500) for implementing an enhanced Stereo Dimensional Array ("SDA") effect in a listener's space, said SDA effect including the generation, in the listener's space of (a) a stereo left main channel sound projection, (b) a stereo right main channel sound projection, (c) a stereo left side SDA effect crosstalk cancelation sound projection, and (d) a stereo right side SDA effect crosstalk cancelation sound projection, said system including: a first or left mid-woofer transducer (e.g., 508L), a second or center mid-woofer transducer (e.g., 508C) and a third or right mid-woofer transducer (e.g., 508R), said first, second and third mid-woofer transducers being spaced equidistantly from one another by a selected inter-driver spacing $D_{IDS}$ and aligned along a Speaker Axis SA configured for use when bisected by a perpendicular listening axis LA that also intersects said listening location in said listening space. Said first or left mid-woofer transducer (e.g., 508L) can be aimed leftwardly to the side at a selected acute angle (e.g., in the range of 40-70 degrees from the listening axis LA, toward the speaker axis SA), can be driven by a Left Stereo+SDA signal 608L which is generated from a filtered, and can be equalized and selectively amplified or attenuated and inverted version of a Right channel input signal. Said second or center mid-woofer transducer (e.g., 508C) can be driven by a Center signal 608C, which can be generated from a selectively amplified or attenuated filtered, equalized version of a Left channel input signal and a filtered, equalized version of a Right channel input signal. Said third or right mid-woofer transducer (e.g., 508R) can be aimed rightwardly to the right side at a selected acute angle (e.g., in the range of 40-70 degrees from the listening axis LA, toward the speaker axis SA), can be driven by a Right Stereo+SDA signal 608R which is generated from a filtered, and can be equalized and selectively amplified or attenuated and inverted version of a Left channel input signal.

The system can include a compact housing (e.g., 501) configured to align and aim said first, second and third mid-woofers in an array designated L–C–R along said speaker axis, and arranged symmetrically, with said Center second mid-woofer (e.g., 508C or "C") being centrally located within said compact housing and aimed forwardly, along said listening axis LA. Said first, second and third mid-woofers can each be configured to radiate sound from an acoustic center and said L–C–R array has said first mid-woofer (e.g., 508L) spaced from said second mid-woofer (e.g., 508C) along said speaker axis by an L–C inter-driver spacing $D_{IDS}$ defined by a lateral spacing or distance separating the acoustic centers of said first mid-woofer and said second mid-woofer, and wherein said L–C inter-driver spacing is in the range of 150 mm to 180 mm.

Interaural crosstalk cancelation (IACC) can be provided by the first and third drivers and the center driver can play summed, unadulterated Left and Right signals (for a stereo program format). The first and third (L and R) mid-bass drivers can play delayed and attenuated L and R signals [e.g., aSDA+cancelation of first-order IACC (FIGS. 6B and 7)].

Interaural crosstalk cancelation (IACC) can be provided by the first and third drivers and the center driver can play summed, unadulterated Left and Right signals (for a stereo program format), thereby generating said four sound projections: (a) said stereo left main channel sound projection, (b) said stereo right main channel sound projection, (c) said stereo left side SDA effect crosstalk cancelation sound projection (SDA-L or LSS), and (d) said stereo right side SDA effect crosstalk cancelation sound projection (SDA-R or RSS). Said first and third (L and R) mid-bass drivers can also play IACC first order effect attenuation L and R signals to provide attenuation or cancellation of first-order IACC effects by generating, in addition to sound projections a-d, two additional sound projections, namely: (e) a second left side SDA effect sound projection (SDA-L2), and (f) a second right side SDA effect sound projection (SDA-R2) (e.g., as illustrated in FIG. 7).

Said compact housing (e.g., 501) can have an overall length along said speaker axis of less than 400 mm. Said compact housing (e.g., 501) can have an overall length along said speaker axis of approximately 366.7 mm. Said L–C inter-driver spacing can be approximately 165 mm. A left tweeter (e.g., 509L) can be spaced between said first or left mid-woofer transducer (e.g., 508L) and said second or center mid-woofer transducer (e.g., 508C). A right tweeter (e.g., 509R) can be spaced between said second or center mid-woofer transducer (e.g., 508C) and said third or right mid-woofer transducer (e.g., 508R).

Various aspects of the present disclose can relate to a method for generating the Stereo Dimensional Array ("SDA") effect (with effective interaural crosstalk cancelation (IACC)) including the generation of four distinct phantom projections of sound in a listener's space (e.g., as shown in FIG. 3B), those are (a) a stereo left main channel sound projection ("L"), (b) a stereo right main channel sound projection ("R"), (c) a stereo left side SDA effect crosstalk cancelation sound projection (cancelling undesired crosstalk from the right channel and illustrated as "LSS"), and (d) a stereo right side SDA effect crosstalk cancelation sound projection (cancelling undesired crosstalk from the left channel and illustrated as "RSS"). The method can include (a) providing a compact elongated enclosure 501 configured to support and aim a multi-element loudspeaker line array including a first mid-woofer transducer (e.g., 508L), a second mid-woofer transducer (e.g., 508C), and a third mid-woofer transducer (e.g., 508R). Said first, second and third mid-woofer transducers can be spaced equidistantly from one another by a selected inter-driver spacing $D_{IDS}$. In some embodiments, only said second, center mid-woofer transducer (508C) is aimed toward a listening location and aligned along a Speaker Axis configured for use when bisected by a perpendicular listening axis that also intersects said listening location in said listening space. The method can include (b) driving said first Left mid-woofer transducer (e.g., 508L) by generating and providing a Left Stereo+SDA signal 608L (e.g., which can be generated from a filtered, equalized and selectively amplified or attenuated and inverted version of a Right channel input signal); (c) driving said second mid-woofer transducer (e.g., 508C) by generating and providing a Center signal 608C (e.g., which can be generated from a filtered, equalized version of a Left channel input signal and a filtered, equalized version of a Right channel input signal); and (d) driving said third mid-woofer transducer (e.g., 508R) by generating and providing Right Stereo+SDA signal 608R (e.g., which can be generated from a filtered, equalized and selectively amplified or attenuated and inverted version of a Left channel input signal).

The method can include generating, for said first and third (L and R) mid-bass drivers, delayed and attenuated L and R signals [aSDA+cancelation of first-order IACC (FIG. 7)]. The method can include generating, for said first, second and third mid-bass drivers, appropriately filtered and delayed FCBD signals (FIG. 3A). The method can include (e) generating, for said first and third (L and R) mid-bass drivers, delayed and attenuated L and R signals [aSDA+ cancelation of first-order IACC (FIG. 7)], and (f) generating, for said first second and third mid-bass drivers, appropriately filtered and delayed FCBD signals (FIG. 3A). The method can include (g) generating, an enhanced soundfield with fewer undesired first order SDA IAC effects to realize six distinct sound projections or phantom sound sources for Stereo SDA in a listener's space (as illustrated in FIG. 7), wherein those six distinct sound projections or phantom sound sources are: (i) a distinct sound projection or phantom sound source for a second order correction SDA-L2, (ii) a distinct sound projection or phantom sound source for SDA-L (which is referred to above as LSS), (iii) a distinct sound projection or phantom sound source for L (the main left channel sound projection), (iv) a distinct sound projection or phantom sound source for R (the main right channel sound projection), (v) a distinct sound projection or phantom sound source for SDA-R (which is referred to above as RSS), and (vi) a distinct sound projection or phantom sound source for a second order correction SDA-R2.

Various aspects of the present disclose can relate to a compact loudspeaker system, which can be programmed to process a plurality of audio signals for generating an enhanced soundfield with fewer undesired first order SDA IAC effects which can include generating or realizing six distinct sound projections or phantom sound sources for Stereo SDA in a listener's space (as illustrated in FIG. 7), and they are: (a) generating or realizing a distinct sound projection or phantom sound source for a second order correction SDA-L2, (b) generating or realizing a distinct sound projection or phantom sound source for SDA-L (which is referred to above as LSS), (c) generating or realizing a distinct sound projection or phantom sound source for L (the main left channel sound projection), (d) generating or realizing a distinct sound projection or phantom sound source for R (the main right channel sound projection), (d) generating or realizing a distinct sound projection or phantom sound source for SDA-R (which is referred to above as RSS), and (e) generating or realizing a distinct sound projection or phantom sound source for a second order correction SDA-R2.

According some aspects of the disclosure, a loudspeaker system can include a first transducer, a second transducer, and a third transducer. The first transducer can be offset from the second transducer in a first direction, such as perpendicular to a longitudinal axis of the second transducer, and the third transducer can be offset from the second transducer in a second direction, such as substantially opposite the first direction. The system can include signal processing electronics, which can be configured to receive a first audio signal, receive a second audio signal, generate a first crosstalk cancelation signal (e.g., the first crosstalk cancelation signal including an inverted instance of the first audio signal, which can be time delayed in some implementations); generate a second crosstalk cancelation signal (e.g., the second crosstalk cancelation signal including an inverted instance of the second audio signal, which can be time delayed in some implementations), drive the second transducer on the basis of the first audio signal and the second audio signal, drive the first transducer on the basis of the first crosstalk cancelation signal, and drive the third transducer on the basis of the second crosstalk cancelation signal.

It will be appreciated by the skilled person that each of the first, second, and third transducers may be driven additionally on the basis of one or more further audio signals (for example, the second transducer may additionally be driven on the basis of a center-channel audio signal).

It will be appreciated by the skilled person that the first crosstalk cancelation signal can be time-delayed relative to the first audio signal. Thus, the sound produced by the first transducer can (in addition to being inverted) be delayed relative to the corresponding sound produced by the second transducer. Similarly, it will be appreciated by the skilled person that the second crosstalk cancelation signal can be time-delayed relative to the second audio signal. Thus, the sound produced by the third transducer can (in addition to being inverted) be delayed relative to the corresponding sound produced by the second transducer.

It will be appreciated by the skilled person that a listener to a stereo loudspeaker system (e.g., one producing distinct audio from the left and right loudspeakers) may experience inter-aural crosstalk between the sound produced by the left and right loudspeakers, due to the differing locations of (and distance between) the listener's ears. It may be that the time delays of the first crosstalk cancelation signal and the second crosstalk cancelation signal are each associated with an expected inter-aural distance of a listener at an expected listening distance. It may be that, in use, the time delay of the first crosstalk cancelation signal is selected such that the sound from the first transducer destructively interferes with the sound produced by the second transducer at a first ear of the listener. Thus, it may be that the resulting sound profile received by the listener at their first ear corresponds substantially only to the second audio signal. It may be that, in use, the time delay of the second crosstalk cancelation signal is selected such that the sound from the third transducer destructively interferes with the sound produced by the second transducer at a second ear of the listener. Thus, it may be that the resulting sound profile received by the listener at their second ear corresponds substantially only to the first audio signal.

It will be appreciated that in some embodiments the sound profiles received by the listener at each ear can also include second-order inter-aural crosstalk (i.e. inter-aural crosstalk associated with the sounds from the first and second crosstalk cancelation signals). In some embodiments, the loudspeaker system can generate and output second-order crosstalk cancelation signals, which can be configured to cancel the second-order inter-aural crosstalk. Loudspeaker systems according to such embodiments can provide reduced inter-aural crosstalk and an expanded acoustic image.

It may be that the loudspeaker system can be configured (for example, by the arrangement of the first, second, and third transducers and/or the time delays applied to the first and second crosstalk cancelation signals) such that the sound received by a listener (for example, at a given listening position) from the loudspeaker system is consistent with having been generated by at least one phantom sound source. In such cases, it may be that the sound is consistent with the phantom sound source being located apart from the first, second, and third transducers. It may be that the sound is consistent with the phantom sound source being located apart from any transducer in the loudspeaker system. It may be that a phantom sound source comprises a notional sound source (for example, associated with a location not having a real-world sound source). It may be that the sound is consistent with having been produced by multiple phantom sound sources (for example, located apart from the first, second, and third transducers). It may be that the multiple phantom sound sources comprises at least two phantom sound sources, or at least three phantom sound sources, or at least four phantom sound sources, or at least five phantom sound sources, or at least six phantom sound sources, or more.

It will be appreciated that the sound received by the listener may comprise, in addition to the sound consistent with the phantom sound sources, sound received from one or more real sources (for example, the second transducer). It may be that the listening position is directly in front of the second transducer (for example, at a predetermined distance from the second transducer). It may be that the sound received by the listener is consistent with been generated by a greater number of transducers than are comprised in the loudspeaker system. Thus, the sound can be characterized as having been generated (at least in part) by one or more phantom sound sources. It may be that the sound received by the listener is consistent with having been generated by five transducers (for example, associated with a desired surround sound configuration). It will be appreciated by the skilled person that the perceived five transducers will each be associated with a respective location. It may be that the sound is consistent with one or more (for example, two or four) of those five perceived transducers being located apart from the first, second, and third transducers. Thus, it may be that the sound received by the listener is consistent with having been generated by one or more (for example, two or four or six) phantom sound sources. Hence, it may be that the sound received by the listener corresponds to five sound projections (for example, consistent with originating from five distinct sound sources). It may be that one or more (for example, two or four) of the five sound projections is associated with a phantom sound source. Such a sound projection may be referred to as a phantom sound projection. It may be that the loudspeaker system is configured to generate (for example, for the listener) a number of sound projections which is greater than the number of transducers in the loudspeaker system. It may be that the loudspeaker system is configured to generate one or more phantom sound sources that are not intended to be perceived by the listener, but are instead generated for the purposes of cross-talk cancelation.

In some embodiments, by generating the first crosstalk cancelation signal, driving the second transducer on the basis of the first and second audio signals, driving the first transducer on the basis of the first crosstalk cancelation signal, and driving the third transducer on the basis of the second crosstalk cancelation signal, the present disclosure operates to generate sound consistent with having been generated by two phantom sound sources. Such phantom sound sources may be associated with left and right stereo audio (or surround sound) channels.

The time delays of the first crosstalk cancelation signal and the second crosstalk cancelation signal may be substantially equal. Alternatively, it may be that the first crosstalk cancelation signal and the second crosstalk cancelation signal are delayed by a different lengths of time. It may be that the time delays of the first crosstalk cancelation signal and the second crosstalk cancelation signal are each less than about 500 μs, less than about 400 μs, less than about 350 μs, or less than about 300 μs. It may be that the time delays of the first crosstalk cancelation signal and the second crosstalk cancelation signal can each be at least about 50 μs, at least about 75 μs, at least about 90 μs, or at least about 100 μs.

It may be that the loudspeaker system comprises only five transducers including tweeters. It may be that the loudspeaker system comprises only three transducers that operate in the mid-range/bass region (or in other words transducers that are not in the form of tweeters). It may be that the first audio signal and the second audio signal are used to directly drive only the second (e.g., middle or center) transducer.

It may be that a longitudinal axis of the second transducer defines a listening axis of the loudspeaker system. In such cases, the first transducer may be arranged such that it faces a direction which is nonparallel with the listening axis. It may be that the first transducer is arranged such that it faces a direction which is angled away from the listening axis. In such cases, the facing direction of the first transducer may be offset from the listening axis by an angle of between 100 and 85°, between 200 and 80°, between 300 and 75°, or between 400 and 70°. The third transducer may (alternatively or additionally) be arranged such that it faces a direction which is nonparallel with the listening axis. The third transducer may (alternatively or additionally) be arranged such that it faces a direction which is angled away from the listening axis. In such cases, the facing direction of the third transducer is offset from the listening axis by an angle of between 100 and 85°, between 200 and 80°, between 300 and 75°, between 400 and 70°.

Driving the second transducer may comprise combining the first audio signal and the second audio signal to produce a combined audio signal. In such cases, the signal processing electronics may be configured to drive the second transducer on the basis of the combined audio signal.

Generating the first crosstalk cancelation signal may comprise applying a time delay to the first audio signal. Generating the second crosstalk cancelation signal may comprise applying a time delay to the second audio signal. Generating the first crosstalk cancelation signal may comprise inverting the first audio signal. Generating the second crosstalk cancelation signal may comprise inverting the second audio signal. Generating the first crosstalk cancelation signal may comprise attenuating the first audio signal. Generating the second crosstalk cancelation signal may comprise attenuating the second audio signal.

It may be that the loudspeaker system comprises a notional speaker axis extending through the second transducer parallel to the first direction. It may be that one or more (for example, all) of the first transducer, the second transducer, and the third transducer are arranged substantially along the speaker axis. Thus, it may be that the notional speaker axis intersects each of the first, second, and third transducers. It may be that the speaker axis is perpendicular to a longitudinal axis of the second transducer. It may be that the second transducer is positioned between (for example, halfway between) the second and third transducers.

It may be that the first transducer is positioned apart from the second transducer by a first distance. It may be that the second transducer is positioned apart from the third transducer by a second distance. Thus, it may be that a separation of the first transducer from the second transducer is substantially equal to a separation of the second transducer from the third transducer. It may be that the second transducer is no more than about 40 cm from the first transducer, no more than about 30 cm, no more than about 25 cm, or no more than about 20 cm. It may be that the second transducer is at least about 3 cm from the first transducer, at least about 5 cm, at least about 10 cm, or at least about 15 cm. It may be that the third transducer is no more than about 40 cm from the second transducer, no more than about 30 cm, no more than about 25 cm, or no more than about 20 cm. It may be that the third transducer is at least about 3 cm from the second transducer, at least about 5 cm, at least about 10 cm, at least about 15 cm.

It may be that the loudspeaker system comprises a housing. The first, second, and third transducers and the signal processing electronics may be contained within the housing. It may be that the housing (and therefore also the loudspeaker system as a whole) has a maximum dimension no greater than about 80 cm, no greater than about 60 cm, no greater than about 45 cm, no greater than 35 cm, no greater than about 30 cm, or any values or ranges between any of these sizes, although other configurations are also possible. Embodiments of the loudspeaker system may be in the form of a soundbar, for example for cinema sound system, for example to accompany a television or AV projector.

It may be that the first audio signal is associated with a right channel of stereo (or surround sound) audio. It may be that the second audio signal is associated with a left channel of stereo (or surround sound) audio.

It may be that one or more (for example, all) of the first transducer, the second transducer, and the third transducer comprise a mid-woofer transducer. It may be that the second transducer comprises a center transducer in the loudspeaker system (i.e. one which is configured to be drive based on the center channel of a surround sound audio signal).

It will be appreciated by the skilled person that a listener may also experience inter-aural crosstalk from the crosstalk cancelation sounds emitted by the first and third transducers (e.g., corresponding to the first and second cancelation signals). Such crosstalk may be referred to herein as second-order inter-aural crosstalk. It may be that the signal processing electronics are configured to generate a first second-order crosstalk cancelation signal. In such cases, the first second-order crosstalk cancelation signal may comprise an inverted and time delayed instance of the first crosstalk cancelation signal. The signal processing electronics may be configured to drive the third transducer on the basis of the second crosstalk cancelation signal and the first second-order crosstalk cancelation signal. It may be that the signal processing electronics are configured to generate a second second-order crosstalk cancelation signal. In such cases, the second second-order crosstalk cancelation signal may comprise an inverted and time delayed instance of the second crosstalk cancelation signal. The signal processing electronics may be configured to drive the first transducer on the basis of the first crosstalk cancelation signal and the second second-order crosstalk cancelation signal. Embodiments of the present disclosure which generate second order crosstalk cancelation signals and drive the first and third transducers further on the basis of those second order crosstalk cancelation signals can provide cancelation of second order inter-aural crosstalk (i.e. inter-aural crosstalk associated with the first and second cancelations signals). Such embodiments can provide a further expanded acoustic image.

According to a various aspects of the disclosure, a method of operating a loudspeaker system are disclosed. The loudspeaker system can include a first transducer, a second transducer, and a third transducer. The first transducer can be offset from the second transducer in a first direction (e.g., substantially perpendicular to a longitudinal axis of the second transducer). The third transducer can be offset from the second transducer in a second direction, which can be substantially opposite the first direction. The method can include receiving a first audio signal, receiving a second audio signal, generating a first crosstalk cancelation signal (e.g., the first crosstalk cancelation signal can include an inverted (e.g., and time delayed in some cases) instance of the first audio signal), generating a second crosstalk cancelation signal (e.g., the second crosstalk cancelation signal can include an inverted (e.g., and time delayed in some cases) instance of the second audio signal), driving the second transducer on the basis of the first audio signal and the second audio signal, driving the first transducer on the basis of the first crosstalk cancelation signal, and driving the third transducer on the basis of the second crosstalk cancelation signal.

According to various aspects of the disclosure, a computer program product (e.g., a non-transitory computer-readable medium) can include instructions which, when executed by a computing device (e.g., a hardware processor), can cause a loudspeaker system to perform operations (e.g., to carry out a method of operating the loudspeaker system). The loudspeaker system can include a first transducer, a second transducer, and a third transducer. The first transducer can be offset from the second transducer, such as in a first direction that can be substantially perpendicular to a longitudinal axis of the second transducer. The third transducer can be offset from the second transducer, such as in a second direction that can be substantially opposite the first direction. The operations can include receiving a first audio signal, receiving a second audio signal, and generating a first crosstalk cancelation signal. The first crosstalk cancelation signal can include an inverted (e.g., and time delayed in some cases) instance of the first audio signal. The operations can include generating a second crosstalk cancelation signal. The second crosstalk cancelation signal can include an inverted (e.g., and time delayed in some cases) instance of the second audio signal. The operations can include driving the second transducer on the basis of the first audio signal and the second audio signal, driving the first transducer on the basis of the first crosstalk cancelation signal, and driving the third transducer on the basis of the second crosstalk cancelation signal.

It will of course be appreciated that features described in relation to one aspect of the present disclosure may be incorporated into other aspects of the present disclosure. For example, the method of the disclosure may incorporate any of the features described with reference to the apparatus of the disclosure and vice versa. The above and still further features and advantages of the present disclosure will become apparent upon consideration of the following detailed description of a specific embodiment thereof, particularly when taken in conjunction with the accompanying drawings, wherein like reference numerals in the various figures are utilized to designate like components.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

FIG. 1C is a diagram illustrating an example compact single-enclosure loudspeaker system in a listening space.

DETAILED DESCRIPTION OF CERTAIN EMBODIMENTS

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1A:
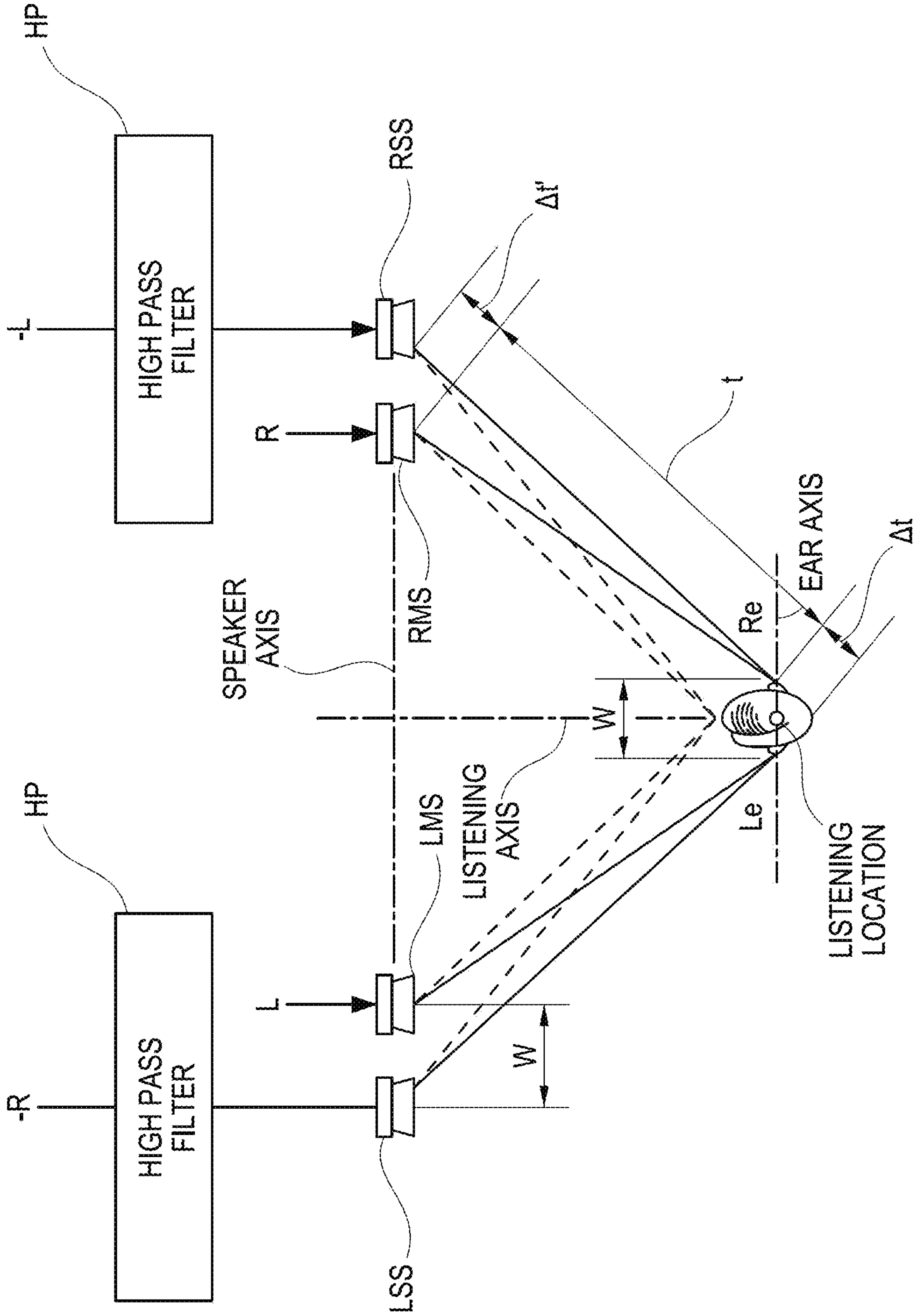
FIG. 1A is a diagram illustrating a loudspeaker system with a stereo pair of "main" left and right channel speakers (LMS, RMS) each including a corresponding "sub" speaker (LSS, RSS), where all four loudspeaker drivers are aligned along a speaker axis in front of a listening location.

FIG. 1A is a diagram showing a stereo pair of "main" left and right channel speakers (LMS, RMS) each including a corresponding "sub" speaker (LSS, RSS), where all four loudspeaker drivers are aligned along a speaker axis in front of a listening location.

Referring again to FIG. 1A, a stereophonic sound reproduction system having a left channel output and a right channel output, a right main speaker (RMS) and a left main speaker (LMS) are at right and left main speaker locations which are equidistantly spaced from the primary listening location. The listening location (shown in the diagram as the top of a listener's head) can be a spatial position for accommodating a listener's head facing the main speakers and having a right ear location $R_e$ and a left ear location $L_e$ along an ear axis, with the right and left ear locations separated along the ear axis by a maximum interaural sound distance of $\Delta t_{max}$ (e.g., distance "W") and the listening location being the point on the ear axis equidistant to the right and left ears. Right effect or sub-speaker (RSS) and left effect or sub-speaker (LSS) are provided at right and left sub-effect or sub-speaker locations which are equidistantly spaced from the primary listening location. The right and left channel outputs are coupled respectively to the right and left main speakers. An inverted right channel signal with the low frequency components attenuated is developed and coupled to the left effect or sub-speaker (LSS). And an inverted left channel signal with the low frequency components attenuated is developed and coupled to the right effect or sub-speaker (RSS).

By careful selection of the distance between the main speakers and sub-speakers (W), sound reproduced by the system can have an expanded acoustic image with no reduction of low frequency response as perceived by a listener located at the listening location. In effect, the spacing "W" between the main and effect or "sub" speakers approximates the space between the ears of the listener, which allows an interaural crosstalk cancelling inverted signal from each "sub" speaker to diminish or eliminate cross talk from the left main speaker to the right ear and from the right main speaker to the left ear, and this interaural crosstalk cancelation ("IACC") can create an audible "stereo dimensional array" (SDA) effect.

One problem for some users is that they may not have enough space for a traditional stereo system with large, standalone left and right speakers. In some systems like that shown in FIG. 1A, the optimal distance ("W") between stereo pair main and effect (e.g., SDA) loudspeakers can be about 7.5-8.0 inches and the length of the speaker axis from end to end (from LSS to RSS) may be over seven feet. Physically small (e.g., compact, single enclosure) loudspeaker systems cannot easily accommodate a requirement to array speaker drivers along an axis seven feet long with a spacing between main and effects speakers of 8 inches. Instead, some listeners want something which is much smaller, which can easily be placed on a tabletop or in front of a television, for use when listening to audio, such as two-channel stereo recordings or 5.1 channel home theater program materials.

FIGS. 1B-1E relate to a compact soundbar package, which can include a system for implementing Stereo Dimensional Array signal processing to provide satisfying playback of two-channel stereo recordings or 5.1 channel home theater program materials. Turning now to FIGS. 1B-1E, the soundbar system can provide six (6) discrete transducers which can be electronically configurable to reproduce individual channels, such as in an audio bitstream. While employing transducers in this manner arguably helps to promote improved channel separation compared to sending signals for mixed channels to the transducers (e.g. FL+SL+C for the left channel in the context of a 2.0 soundbar for a "phantom center" configuration reproducing a DD/DTS 5.1 bitstream), doing so increases the number of transducers in the product.

For audio soundbar systems, interaural crosstalk cancelation (IACC) can be employed to improve stereo image breadth. For example, two sets of mid-bass transducer pairs can be employed with each inner driver (8LMS, 8RMS) responsible for the "stereo" or "main" left or right channel while the outer "stereo dimensional array" (SDA) or "effects" drivers (e.g., (8LSS, 8RSS) can handle a corrective IACC signal that is derived from the difference between the targeted left and right channels (e.g., +/−(FL−FR) or +/−(SL−SR) for the front and surround channels respectively).

Referring again to FIG. 1A, the Stereo Dimensional Array ("SDA") effect (with effective interaural crosstalk cancelation (IACC)) can use four distinct projections of sound in a listener's space, those are (a) a stereo left main channel sound projection (illustrated in FIG. 1A as "L"), (b) a stereo right main channel sound projection (illustrated in FIG. 1A as "R"), (c) a stereo left side SDA effect crosstalk cancelation sound projection (cancelling undesired crosstalk from the right channel and illustrated in FIG. 1A as "LSS"), and (d) a stereo right side SDA effect crosstalk cancelation sound projection (cancelling undesired crosstalk from the left channel and illustrated in FIG. 1A as "RSS"). While the soundbar system illustrated in FIGS. 1B-1E can make those four distinct sound projections and so provided a surprisingly expanded and stable sonic image for home users enjoying music and movies, there were some aspects in which improvements were sought. For example, as illustrated in FIG. 1F, the stereo driver compliment (e.g., the inner pair of mid-bass transducers 8LMS, 8RMS responsible for the "stereo" or "main" left or right channel) could, in certain situations, generate uneven magnitude response effects which are audible to listener, which is sometimes referred to as a "Comb Filtering" effect. The Comb Filtering effect is audible as a listener moves laterally off the central transverse listening axis, so different listeners sitting on a couch may not all experience the desired sound. Another issue is the cost of making a product. Any design change which can preserve the best performance and convenience aspects of a product while reducing the cost to make that product are worth exploring. Some embodiments disclosed herein can provide improved acoustic performance, such as by reproducing audio program material with broad, wide and stable acoustic images for listeners at various locations within a seating or listening space, regardless of each listener's location relative to the loudspeaker within the listening space. Some embodiments disclosed herein can provide a loudspeaker system product more economically, such as by using fewer drivers.

Various embodiments disclosed herein can provide an improved loudspeaker system. Various embodiments disclosed herein can provide an improved method and system for implementing a new form of Stereo Dimensional Array ("SDA") signal processing which is effective when used in compact loudspeaker products. Various embodiments disclosed herein can provide these improvements and advantages more economically as compared to other systems.

Figure 1B:
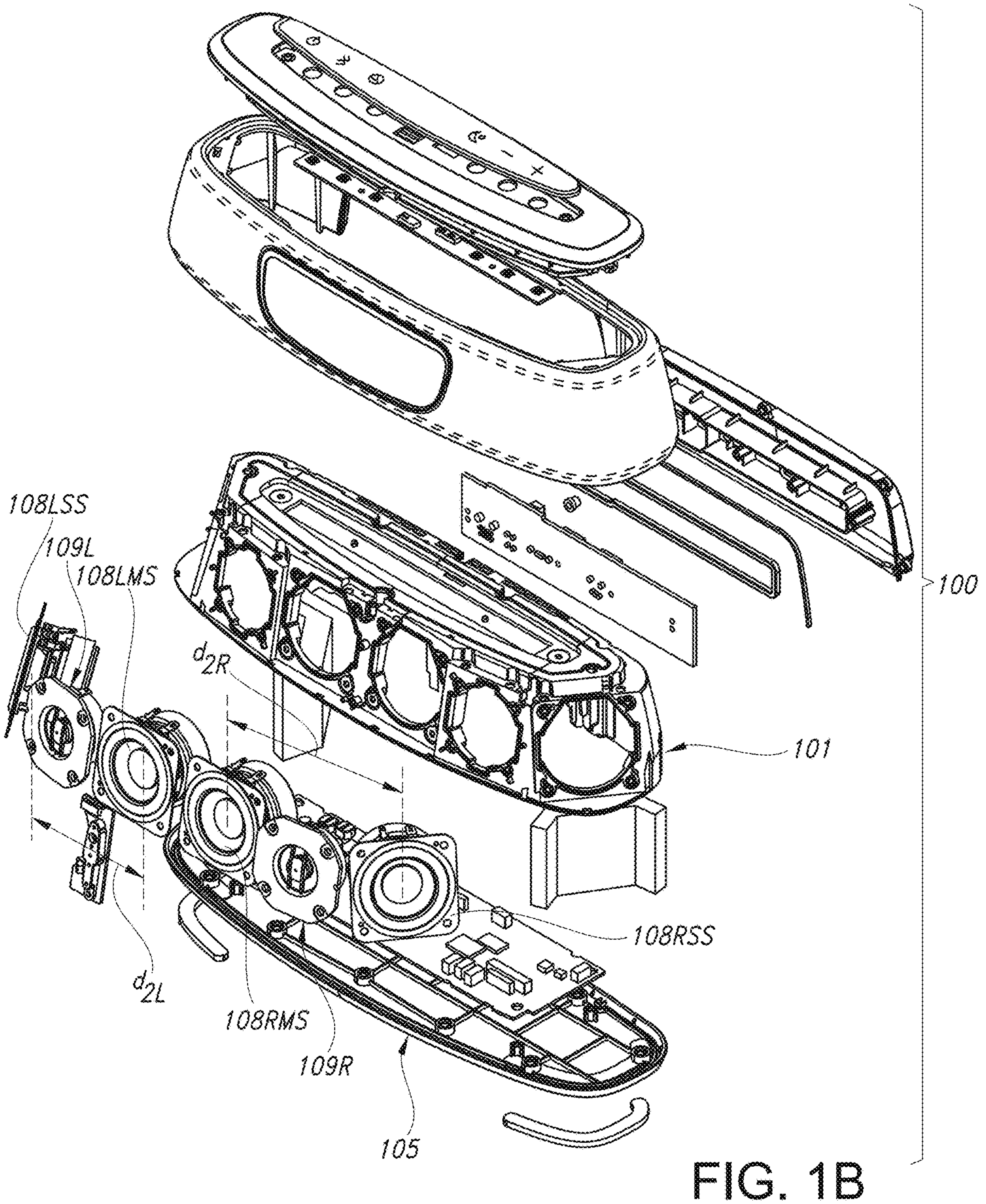
FIG. 1B is an exploded view of an example compact single-enclosure loudspeaker system.
Figure 1D:
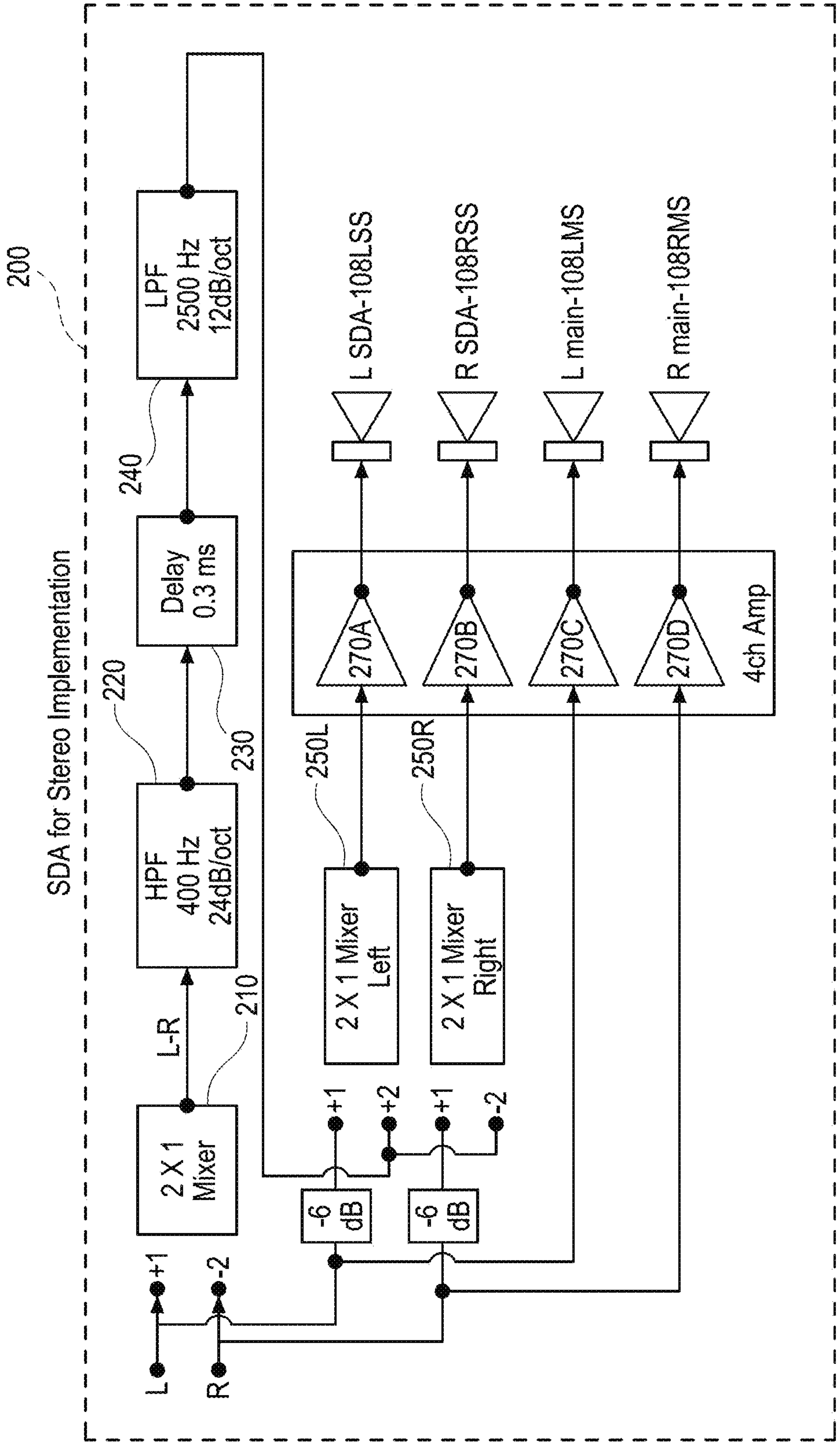
FIG. 1D shows a diagram of an example signal processing system for a loudspeaker system.
Figure 1E:
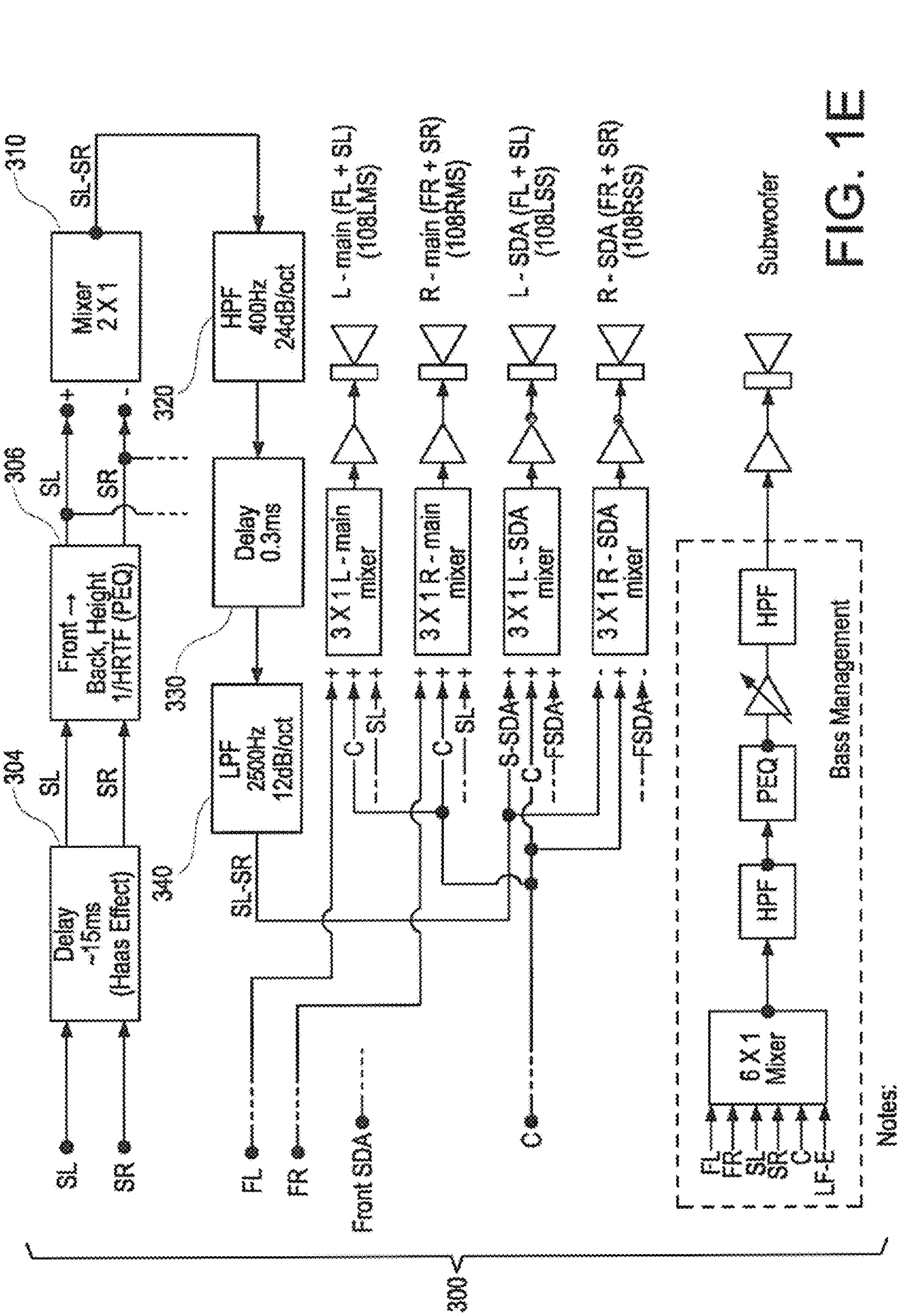
FIG. 1E shows a diagram of another example signal processing system for a loudspeaker system.
Figure 1F:
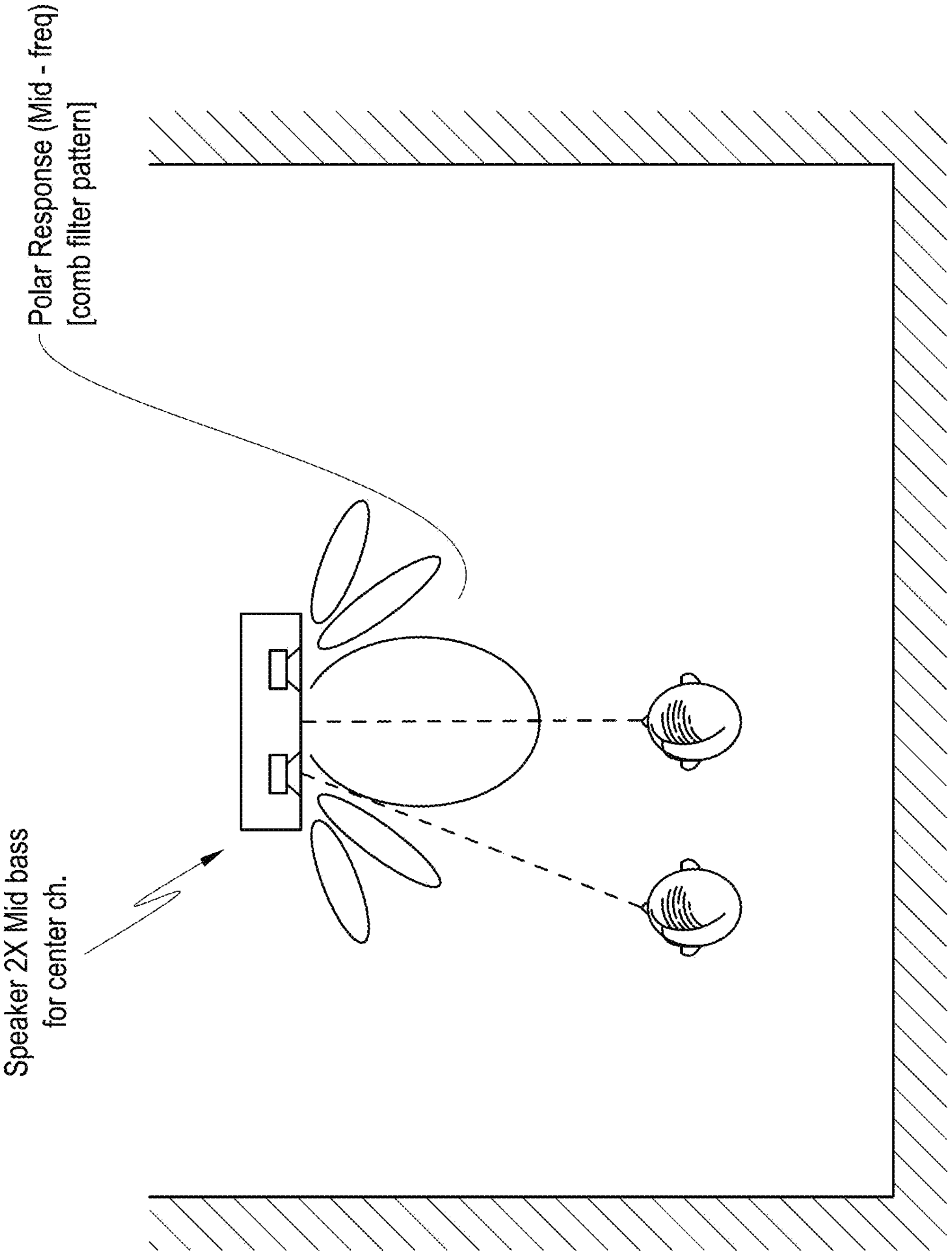
FIG. 1F shows an example loudspeaker system in a listening space.

Some examples of the methods and systems of the present disclosure are able to reduce driver count, as compared to the system of FIGS. 1B and 1C, by establishing a driver configuration for an SDA loudspeaker comprising a center-located mid-bass driver which handles the center channel along with the Left (e.g., front left (FL) and/or surround left (SL)) and Right (e.g., front right (FR) and/or surround right (SR)) "main" signals within an SDA arrangement. A laterally oriented pair of mid-bass drivers playing SDA effects signals can widen the stereo soundfield (for example, with a breadth that extends laterally well beyond the loudspeaker enclosure itself).

By providing a center located driver for reproducing the center channel, for example in a Dolby or DTS 5.1 mix, some embodiments can eliminate the above-described comb-filtering effects which can occur for (a) the example of FIGS. 1B, 1C, and 1F and (b) other 2.0 (e.g., phantom center) soundbars for an off-axis listener due to constructive and destructive interference which generate the uneven magnitude response issues that arise when a multitude (two or more) of laterally displaced audio transducers reproduce the same audio signal. In such situations (e.g., as shown in FIG. 1F), the off-axis amplitude response of a 2.0 soundbar can produce peaks and notches. In comparison, the system of some embodiments disclosed herein can produce a relatively smooth acoustic magnitude response over a wider listening window.

The transducer configuration of various embodiments disclosed herein may provide Left, Left SDA effect, Right and Right SDA effect sound reproduction in a listener's space, but from only three (not four) mid-bass drivers. The transducer configuration may include a newly developed DSP signal flow to provide the Left and Right Stereo and Left side and right side SDA acoustic spatial widening (and IACC) effects. The Front Left ("FL") and Front Right ("FR") signals may be processed using band-pass filters (e.g., comprised of serial high-pass and low-pass filters) which can operate on all three of the mid-bass drivers in the system. It may be that low pass filters function in concert with the high pass filters applied to first and second tweeters which cover the upper three octaves of the audio passband (approximately 2.5-20 kHz) while high pass filters are needed above the mixed mono bass signal that is reproduced by all of the drivers. A signal processing system (such as a version of Polk Audio's Full Complement Bass Drive™ signal processing ("FCBD")) can cause all of the mid-bass transducers to reproduce a substantially identical monophonic bass mix, thereby avoiding interchannel phase deviations which could otherwise lead to driver "unloading", over-excursion and/or distortion.

In some embodiments, the SDA effect may be accomplished in part by (a) a physical acoustic alignment sometimes referred to herein as "acoustic SDA" (aSDA), and/or (b) by electronic (e.g., digital) signal processing sometimes referred to herein as "electronic SDA" (eSDA). The latter (eSDA) may use Left and Right side drivers (e.g., side-firing drivers) reproducing both the main signals and delayed SDA effects. For eSDA, the center mid-bass driver's DSP FL/FR mixer inputs may be set to "0" since the L and R mid-bass drivers reproduce both the main and SDA effects. SDA effects may comprise the delayed, band-pass filtered and inverted FL and FR channels. They may be mixed with FL and FR signals, which can be subjected to a similar band-pass filter and other response shaping. In the DSP block "FL_SDA_Mix" for example, FL and inverted FR (e.g., with delay) may be combined to generate an FL−FR signal which is reproduced by the Left mid-bass driver. Similarly, the Right mid-bass driver may reproduce FR−FL, which can be FR combined with inverted FL (e.g., with delay). While theoretically it might be expected that an optimal SDA value would be approximately 10-30 of micro-seconds for common listening distances (e.g., based on the difference in path lengths), experimentally it has been determined that setting "Frnt_SDA_Delay" to approximately 200 uSec (or 0.2 ms) or about one order of magnitude larger than the expected value can provide a surprising improvement in spatial widening. Other delay times can also be used, as discussed herein.

Further with regard to eSDA, to create phantom SDA sources, the SDA effects, which can be comprised of +/−(L−R) signals, the SDA signals may be delayed, such as in accordance with the lag that would occur if actual, dedicated SDA effect transducers were present. In some cases, imposing a delay an order of magnitude or so larger than the theoretical expected value can provide surprisingly effective enhanced spatial widening, as discussed herein.

Acoustic SDA (aSDA) as applied in the speaker configuration of some embodiments, may comprise summing the L and R channels and directing the result to the center-located mid-bass driver. The associated DSP may include selected settings for a DSP block entitled "C_mid_mixer (described below). Thus, the "main" or "stereo" components of the FL and FR signals may be reproduced by the center mid-bass driver while the Left and Right side side-firing ("L and R") mid-bass drivers may play the SDA effects. For aSDA, the DSP processing may use dedicated "mixer" blocks programmed for each channel such that the main component of the FL and FR signals are muted and the SDA effects are unattenuated in each mixer for the left and right drivers.

As discussed in connection with FIG. 7, an improvement over the first-order SDA methods described herein addresses cancelation of SDA's secondary artifacts. While SDA signals substantially cancel interaural crosstalk, there may be unintended secondary effects that occur due to the Inter Aural Crosstalk ("IAC") associated with the first order SDA signals. As will be shown and described herein, first order SDA signals SDA-L/L and SDA-R/R can effectively reach the listener's Left and Right ears respectively in a direct manner, thereby cancelling interaural crosstalk signals L/R and R/L. However, there may remain secondary artifacts of the first order SDA signals, shown as SDA-L/R and SDA-R/L, which respectively are the crosstalk signal associated with the first order SDA signals SDA-L/L and SDA-R/R. Significant improvements in spatial widening may be realized by cancelling these unintended secondary IACC signals. In some cases, SDA signals may be substantially determined by +/−(L−R) (or sometimes simply inverted L or R signals) difference signals with appropriate magnitude shaping and attenuation. Secondary SDA signals, intended to cancel the first order SDA signals, may too be composed of difference or inverted signals. A listener's left ear may improperly hear SDA-R/L and that content may be delayed relative to SDA-L/L by a time lag proportional to the path length difference between an IAC path (such as SDA-R/L's) and the direct path of a same-side SDA effects signal such as SDA-R/R. Inverted, properly delayed SDA-R/L and SDA-L/R signals can respectively cancel first order SDA IAC. These secondary cancelation signals may be expressed as "minus (−L)" and "minus(−R)" or simply +L and +R, in some embodiments. They may be appropriately attenuated and delayed. While tertiary and subsequent IACC signals may also be present and can be addressed in a recursive manner, dealing with secondary IACC artifacts can substantially eliminate unintended IACC thereby dramatically improving spatial widening. While the required delay, generally dependent upon listening distance, theoretically should be approximately 10-30 microseconds (e.g., based on the difference in path lengths), setting the secondary IACC signals to be larger (e.g., about an order of magnitude larger) can be surprisingly effective, especially given the system's compact size.

Turning now to FIGS. 2A-7, some embodiments can provide a surprisingly effective method and system for generating a full Stereo and/or SDA effect sound field using a configuration of transducers and/or drivers. The system of the embodiments can be readily configured in a compact multi-channel single enclosure loudspeaker system 500 which can include transducers, amplifiers and digital signal processing ("DSP") circuitry (e.g., circuits) programmed to implement a method for reproducing audio, such as stereo audio program material with satisfyingly broad, wide and/or stable acoustic images for listeners at various locations in a listening space, such as regardless of each listener's location relative to the loudspeaker within the listening space.

Figure 2A:
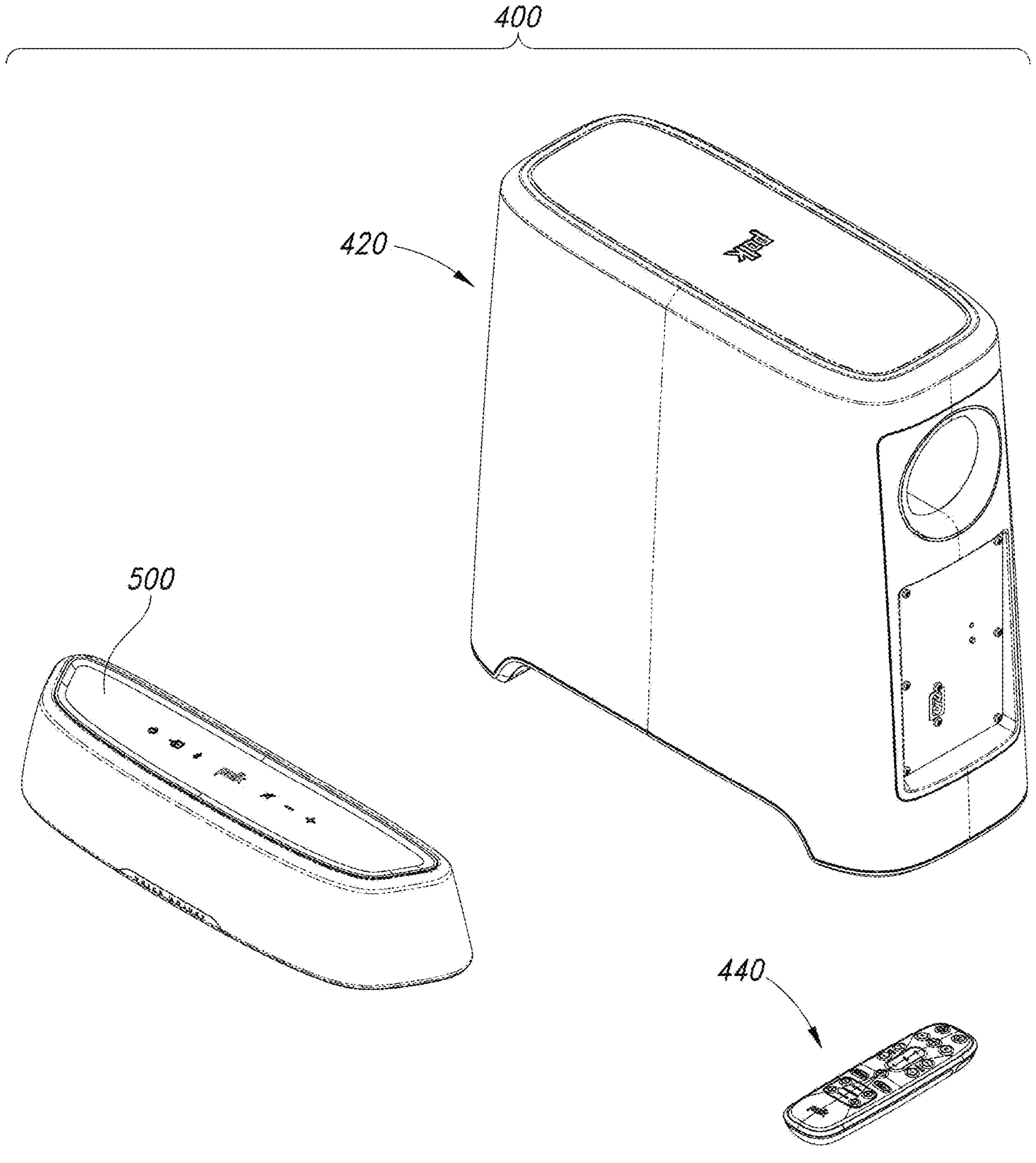
FIG. 2A illustrates an example of a system that includes an improved compact single-enclosure multi-channel loudspeaker system.
Figure 2C:
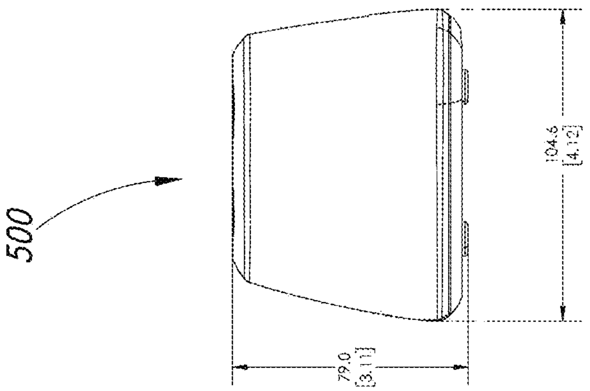
FIG. 2C shows a side view of the example compact single-enclosure multi-channel loudspeaker system of FIG. 2A.

With reference to FIG. 2A, the system 400 can include a soundbar 500, which can be a multi-channel single enclosure loudspeaker system. As shown in FIG. 2A, in some implementations the system 400 includes a subwoofer 420, although in some cases the subwoofer 420 can be omitted. In some implementations, the system can include a remote control 440, although in some cases the remote control 440 can be omitted. The soundbar 500 can be configured to receive and execute commands from the remote control 440. In some cases, the system 400 can include additional loudspeakers, such as surround speakers or ceiling mounted speakers, or the like. In some implementations, the soundbar 500 can be used by itself, or with only the subwoofer 420.

The system (e.g. 400) can provide improved reproduction of Home Theater (e.g., Dolby Digital ("DD")) program material. The compact soundbar system 500 may receive audio input signals in any of several industry standard formats and may decode and render the audio input signals differently, depending for example on whether the audio input signals are for use in connection with home theater specific audio playback signals (e.g., Dolby Digital ("DD") 5.1, Dolby Atmos or DTS-X, including 5.1.2 or 5.1.4) or stereo music playback signals (which can be rendered from those same bitstream formats). For example, system 400 and soundbar 500 may be compatible with and comprise a system configured to decode and render DD or DTS 5.1.4 bitstreams into channel-based signals. Some embodiments can provide improved processing of stereo Left (L) and Right (R) channel-based signals (sometimes referred to as Front Left (FL) and Front Right (FR) signals) to generate an enhanced Stereo (e.g., SDA) experience. The circuitry for receiving, decoding and rendering the incoming audio signal bitstream into channel-based signals is not described or illustrated in the attached drawing figures, but instead the rendered channel-based L and R (or FL and FR) signals are indicated as specific channel inputs in the various figures, as described further below.

Figure 3A:
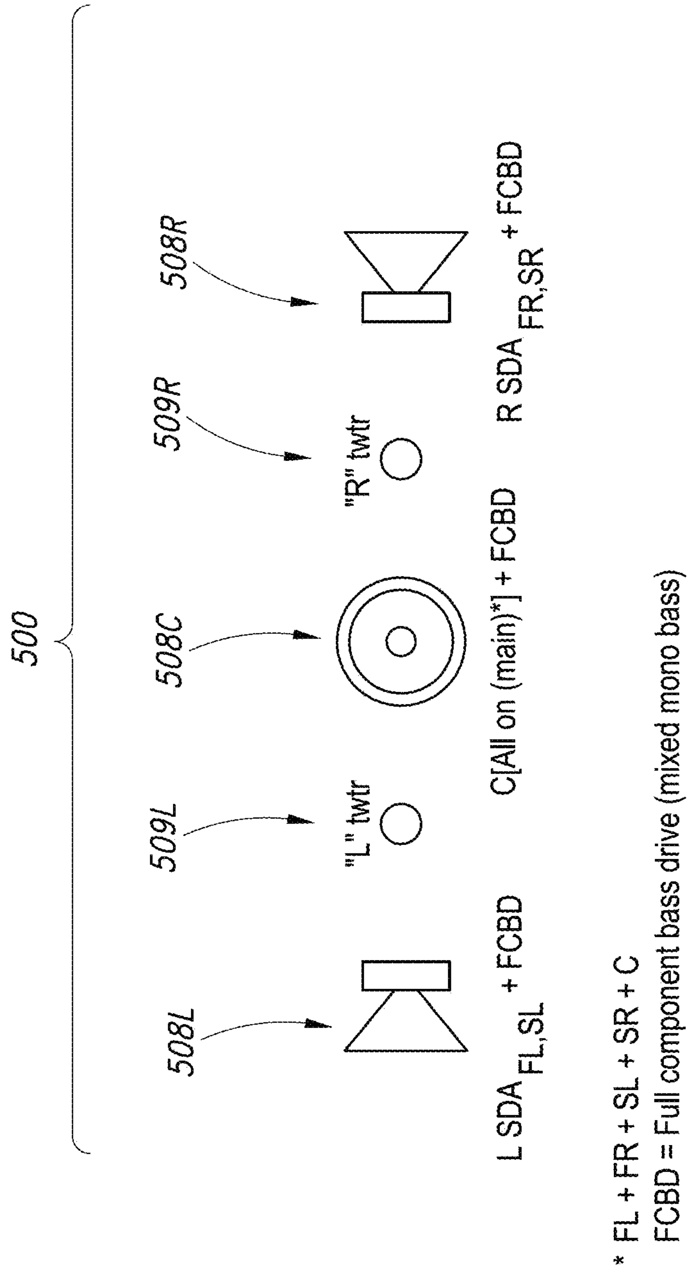
FIG. 3A shows a schematic diagram of drivers for an example loudspeaker system.
Figure 3B:
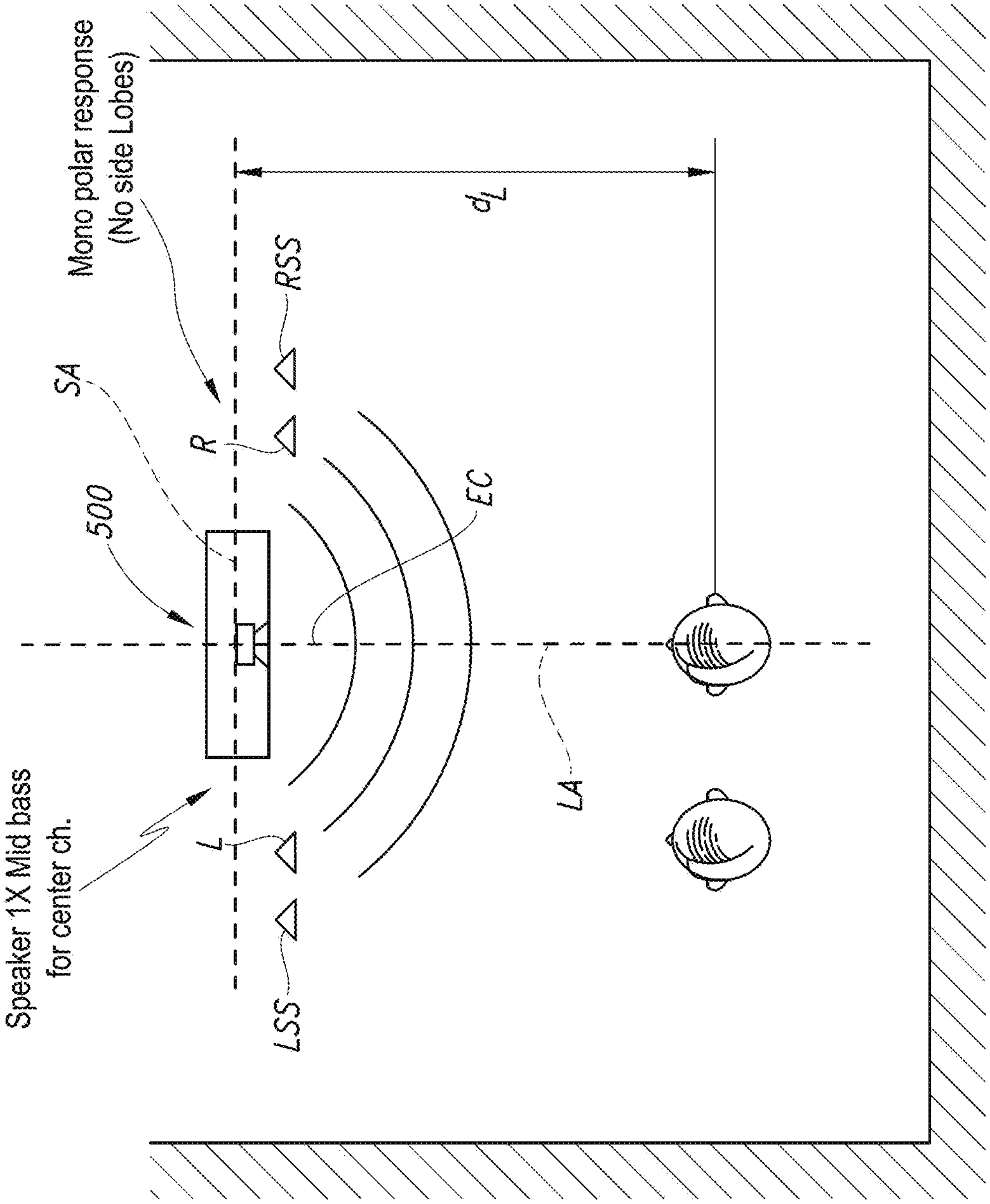
FIG. 3B shows an example compact single-enclosure multi-channel loudspeaker system in a listening space.

In a system or method according to some embodiments, an enhanced Stereo Dimensional Array ("SDA") effect can be generated in a listening space (see, e.g., FIG. 3B). As noted herein, that SDA effect can include the generation, in the listening space of (a) a stereo left main channel sound projection (L), (b) a stereo right main channel sound projection (R), (c) a stereo left side SDA effect crosstalk cancelation sound projection (LSS), and (d) a stereo right side SDA effect crosstalk cancelation sound projection (RSS). These four distinct sound projections might be imagined as four imaginary sound sources (e.g., resembling FIG. 1A), but in some embodiments, those four sound projections can be generated by only three (3) mid-woofer or mid-bass drivers, e.g., aligned in an array along a speaker axis. In some embodiments, the phantom sound projections can be generated psycho-acoustically, with appropriately timed delays and/or attenuated signals.

The system of such embodiments can be implemented in a variety of sizes, from enormous to compact, but is well suited for use in a compact table-top active loudspeaker system (e.g., soundbar 500 as illustrated in FIGS. 2A-2D).

An example embodiment can include a home theater system 400 (e.g., as illustrated in FIG. 2A) including a soundbar system 500, which can be configured to work with active subwoofer 420 and remote control handset 440. The compact soundbar system 500 can have the three drivers (e.g., mid-range drivers) 508L, 508C, and 508R supported within and aimed from a compact housing or structure which places the acoustic centers of the drivers 508L, 508C, and 508R closer than the 8-9 inches (e.g., between Main and SDA effects drivers) used in some other systems, and prototype development work has revealed that selected delays must be incorporated in the DSP for the outer drivers, as described further herein. A distance between the center driver 508C and the left driver 508L, and/or a distance between the center driver 508C and the right driver 508R can be about 100 mm, about 110 mm, about 120 mm, about 130 mm, about 140 mm, about 150 mm, about 160 mm, about 165 mm, about 170 mm, about 180 mm, about 190 mm, about 200 mm, about 210 mm, about 220 mm, about 230 mm, about 240 mm, about 250 mm, or any values or ranges between any of these distances, although other configurations are possible.

The compact loudspeaker system soundbar 500 illustrated in FIGS. 2A-3B can be a five transducer or driver compact loudspeaker product with a chassis, enclosure or housing, which can include a planar bottom cap 505 upon which is mounted enclosure sidewall member 501 with a substantially vertical front wall segment or baffle having a proximal or front surface bounded by a left end opposing a right end. The soundbar assembly 500 can include first second and third midrange, mid-woofer or midbass drivers, 508L, 508C and 508R. Enclosure 501 can have an angled left side baffle surface with a symmetrically configured opposing angled right side baffle surface. In the illustrated embodiment of 2A to 2D, the compact enclosure 501 is configured as a compact soundbar enclosure aligned along a speaker axis having forward facing midbass driver 508C centrally positioned and aimed to radiate sound forwardly from the enclosure center EC. The enclosure 501 can also aim and support a first (e.g., angled) midbass driver 508L mounted and aimed laterally on the left side baffle surface with a (e.g., symmetrically configured) third (e.g., angled) midbass driver 508R mounted and aimed laterally on the right side baffle surface. The first and third drivers (508L, 508R) can be mounted upon the opposing left and right side baffle surfaces and can be angled and aimed outwardly or laterally in opposing directions, e.g., firing to the left and right sides. In some embodiments, the second or center driver 508C can face in a first direction (e.g., straight ahead forward along the enclosure center (EC)). The first or left driver 508L and/or the third or right driver 508R can face in second and/or third direction(s) that are angled outward away from the first direction or EC by about 5 degrees, about 10 degrees, about 15 degrees, about 20 degrees, about 30 degrees, about 40 degrees, about 45 degrees, about 50 degrees, about 60 degrees, about 70 degrees, about 75 degrees, about 80 degrees, or about 90 degrees, or any values or ranges therebetween, although other configurations are possible. In some cases, the first or left driver 508L and/or the third or right driver 508R can face parallel to the second or center driver 508C (e.g., straight ahead).

Figure 2B:
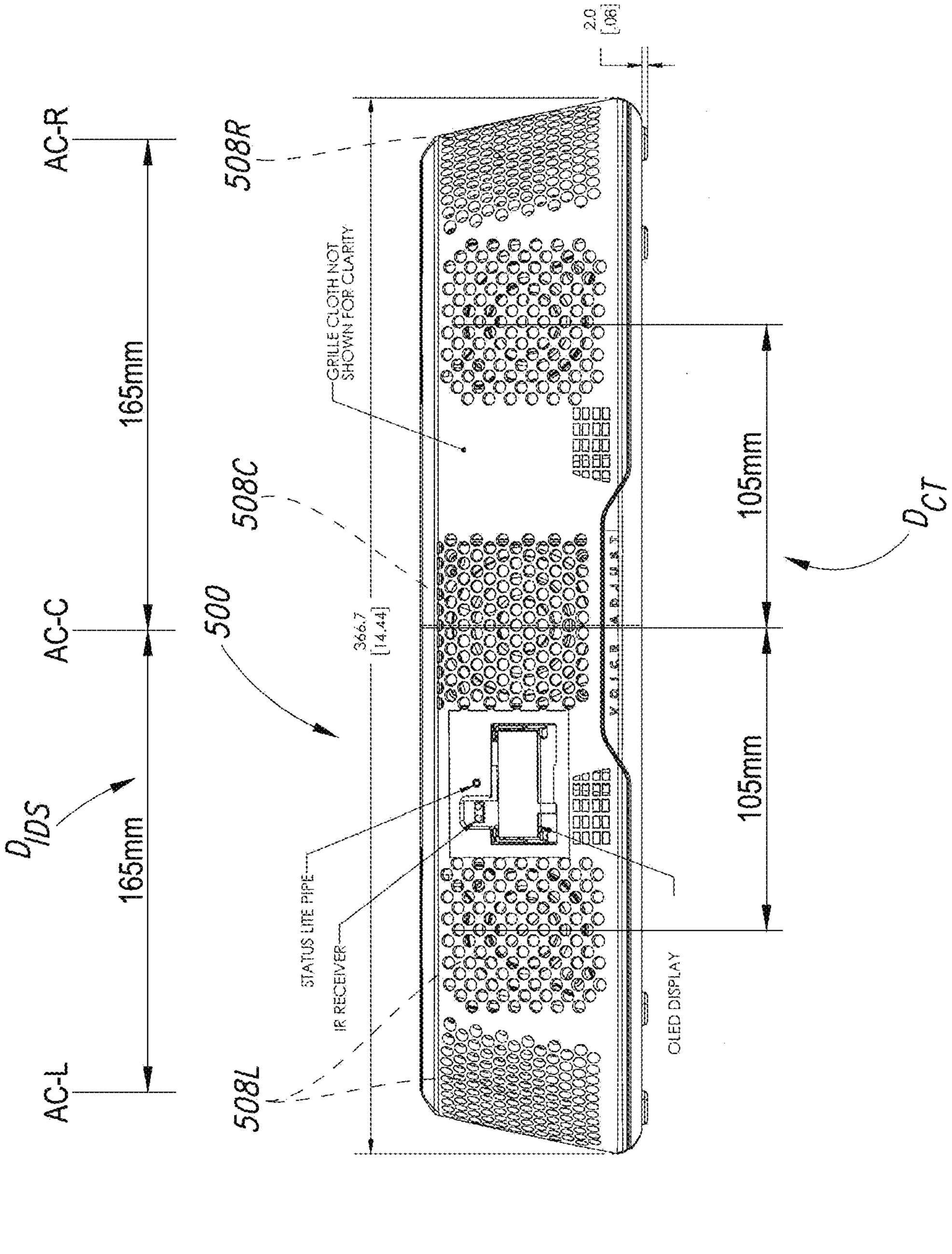
FIG. 2B shows a front view of the example compact single-enclosure multi-channel loudspeaker system of FIG. 2A.

The front baffle surface can also support first and second tweeter or high-range drivers or transducers 509L, 509R. The tweeters can be mounted such that their acoustic centers are laterally spaced from the acoustic center of center midbass driver 508C by about 90 to about 120 mm, and preferably, as illustrated in FIG. 2B, by about 105 mm (within selected tolerances), although other configurations are possible. Referring again to FIG. 2B, first, second and third midbass or mid-woofer drivers (508L, 508C, 508R) are each configured to radiate sound from an acoustic center and to provide an L–C–R midbass array. So first mid-woofer 508L radiates its sound from acoustic center AC-L while second mid-woofer 508C radiates it's sound from acoustic center AC-C and third mid-woofer 508R radiates it's sound from acoustic center AC-R. In the L–C–R array of mid-woofers or midbass drivers shown in FIGS. 2B and 2C the first mid-woofer's acoustic center AC-L is spaced from the second mid-woofer's acoustic center AC-C along the speaker axis by an L–C inter-driver spacing defined by a lateral spacing or distance separating the acoustic centers of said first mid-woofer and said second mid-woofer, and wherein said L–C inter-driver spacing is in the range of about 150 mm to about 180 mm (e.g., or about 165 mm, as shown in the example of FIG. 2B), or any of the other spacing values and ranges discussed herein.

Signal processing algorithms programmed into a microprocessor and DSP circuitry included with dedicated power amplifiers (e.g., as described herein and illustrated in FIGS. 4A-6B) can employ a selected interval of digital delay to compensate for the compact (i.e., closer than typically optimal) spacing of main and sub (or SDA cancelation effect generating) transducers, which can be oriented laterally (facing outward) as opposed to facing forward. In some cases, given their acoustically small dimensions and limited bandwidth, "sub" transducer orientation (e.g., laterally) may not be critically important to generating the desired acoustic image enhancing effect, but it can permit the lateral extent of the enclosure to be small (e.g., less than 400 mm, as illustrated in FIG. 2B) which can be smaller than an enclosure with similar performance having all four drivers on a front facing baffle. In the example embodiment illustrated in FIGS. 2A-3B, the overall transverse width of the compact SDA multi-channel loudspeaker system or product 500 is 366.7 mm or 14.44 inches. The width or maximum dimension of the sound bar 500 can be about 300 mm, about 325 mm, about 350 mm, about 375 mm, about 400 mm, about 425 mm, about 450 mm, about 475 mm, about 500 mm, about 550 mm, about 600 mm, about 650 mm, about 700 mm, about 750 mm, about 800 mm, or any values or ranges between any of these values, although other configurations are also possible.

Turning now to FIGS. 3A-6B, the nomenclature and configuration of the system and method for computing appropriate (e.g., the most satisfying) delays for certain embodiments bears some similarity to the SDA systems of FIGS. 1A-1E but with some important differences.

FIG. 3B is a diagram illustrating the compact loudspeaker product 500 aligned along a lateral speaker axis SA and centered on a transverse listening axis LA, where the nearest listener's ears are at a distance $d_L$ from a front surface of the enclosure and roughly centered on a central axis intersection at EC.

Figure 6A:
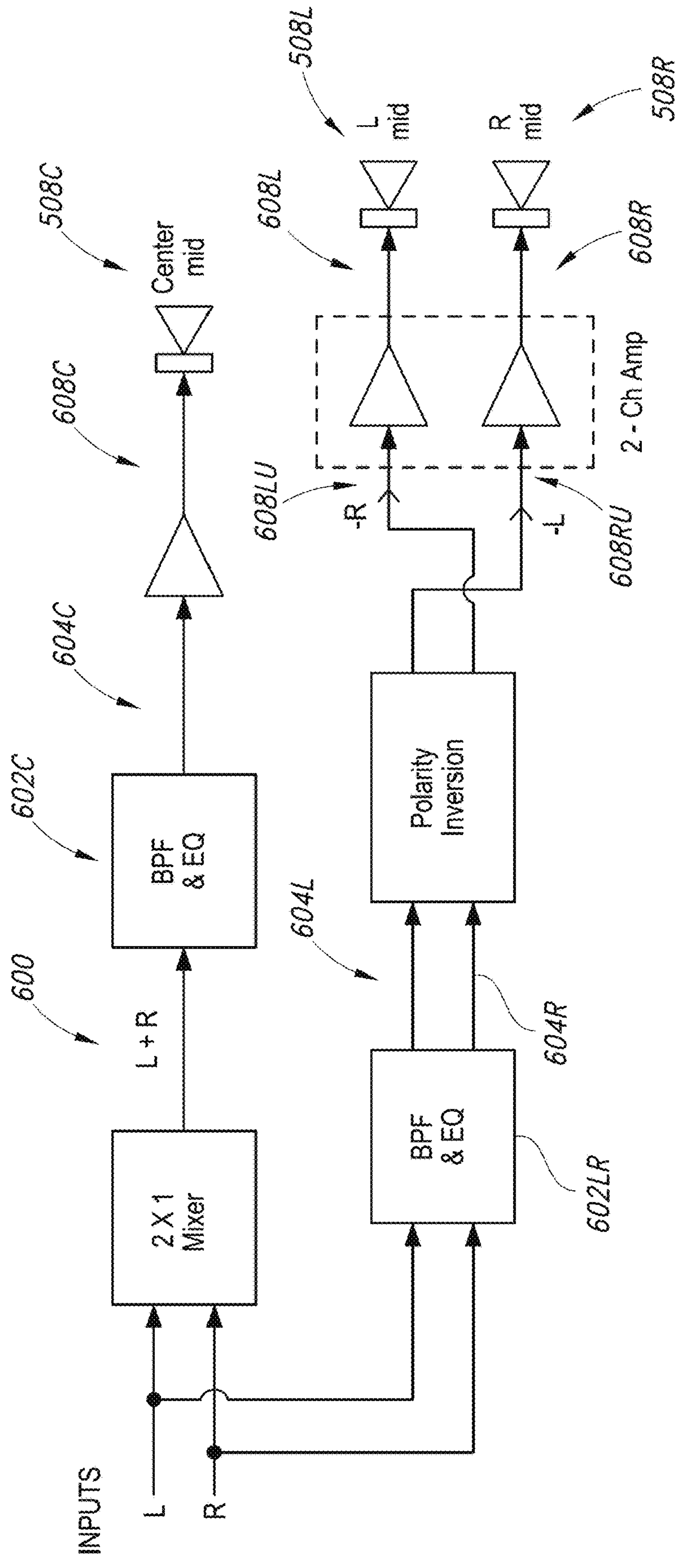
FIG. 6A shows example signal processing features for a loudspeaker system.
Figure 6B:
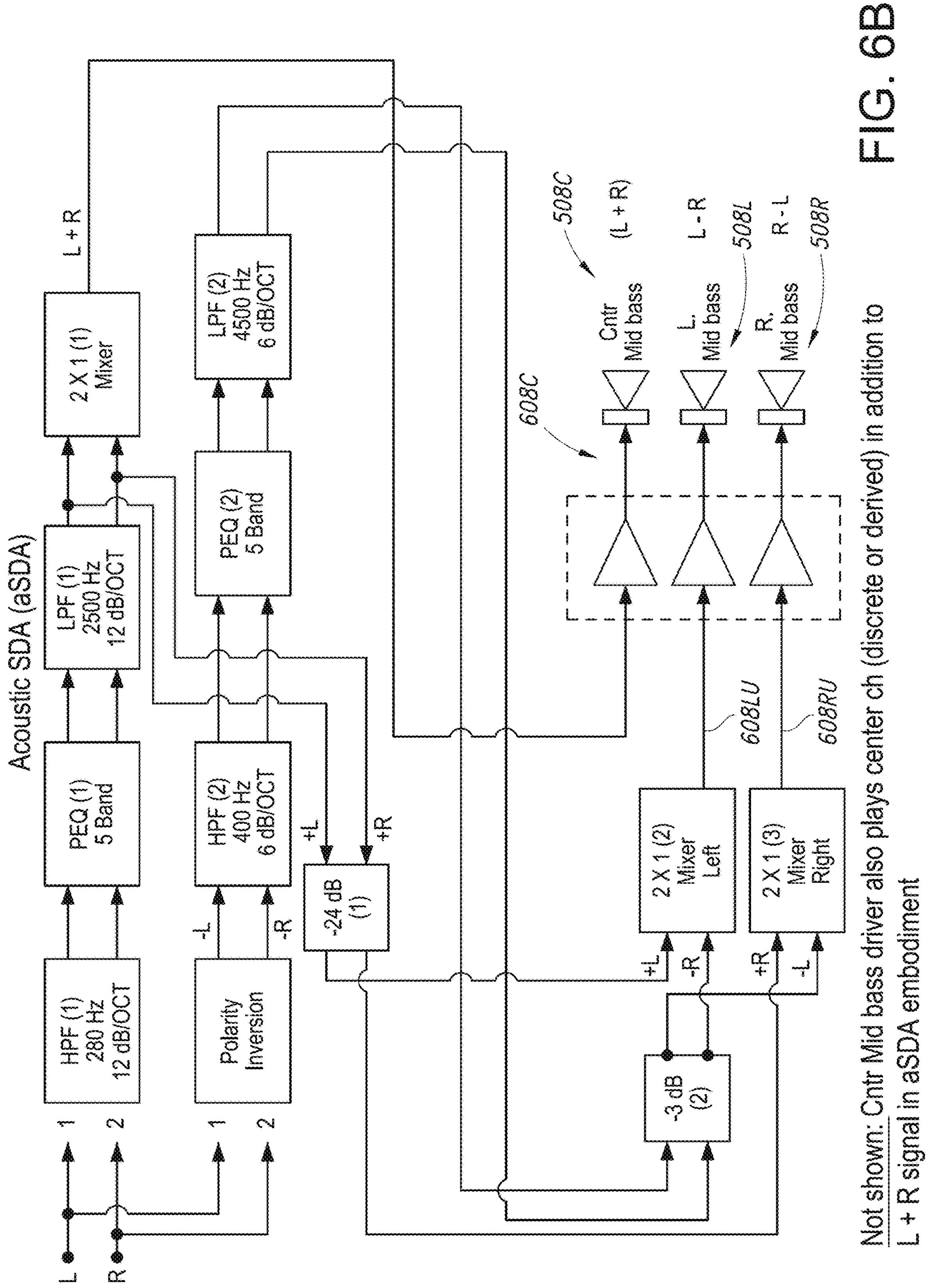
FIG. 6B shows example signal processing features for a loudspeaker system.

FIGS. 6A and 6B illustrate example embodiments of the DSP created to implement SDA using the transducer configurations illustrated in FIGS. 2A-3A. The simplified diagram of FIG. 6A shows only the processing basics for Front Left and Front Right ("FL and FR") signals, omitting C, SL and SR channels (which some embodiments can include) for illustrative purposes. FIG. 6B is a more detailed illustration of example signal processing, sometimes referred to here as Acoustic SDA ("aSDA"). FIG. 6B illustrates that band-pass filters (e.g., comprised of serial high-pass and low-pass filters) can operate on all of the mid-bass drivers (e.g. 508L, 508C and 508R) in the system 500. Low pass filters can function in concert with the high pass filters applied to the tweeters (e.g., 509L, 509R) which can cover the upper three octaves of the audio passband (approximately 2.5-20 kHz), while high pass filters can be used above the mixed mono bass signal that is reproduced by all of the drivers. Optionally, signal processing (e.g., Polk's Full Complement Bass Drive ("FCBD") processing) can cause all of the mid-bass transducers (e.g. 508L, 508C and 508R) to reproduce substantially the same monophonic bass mix, thereby avoiding interchannel phase deviations which could otherwise lead to driver "unloading", over-excursion and/or distortion.

Figure 4A:
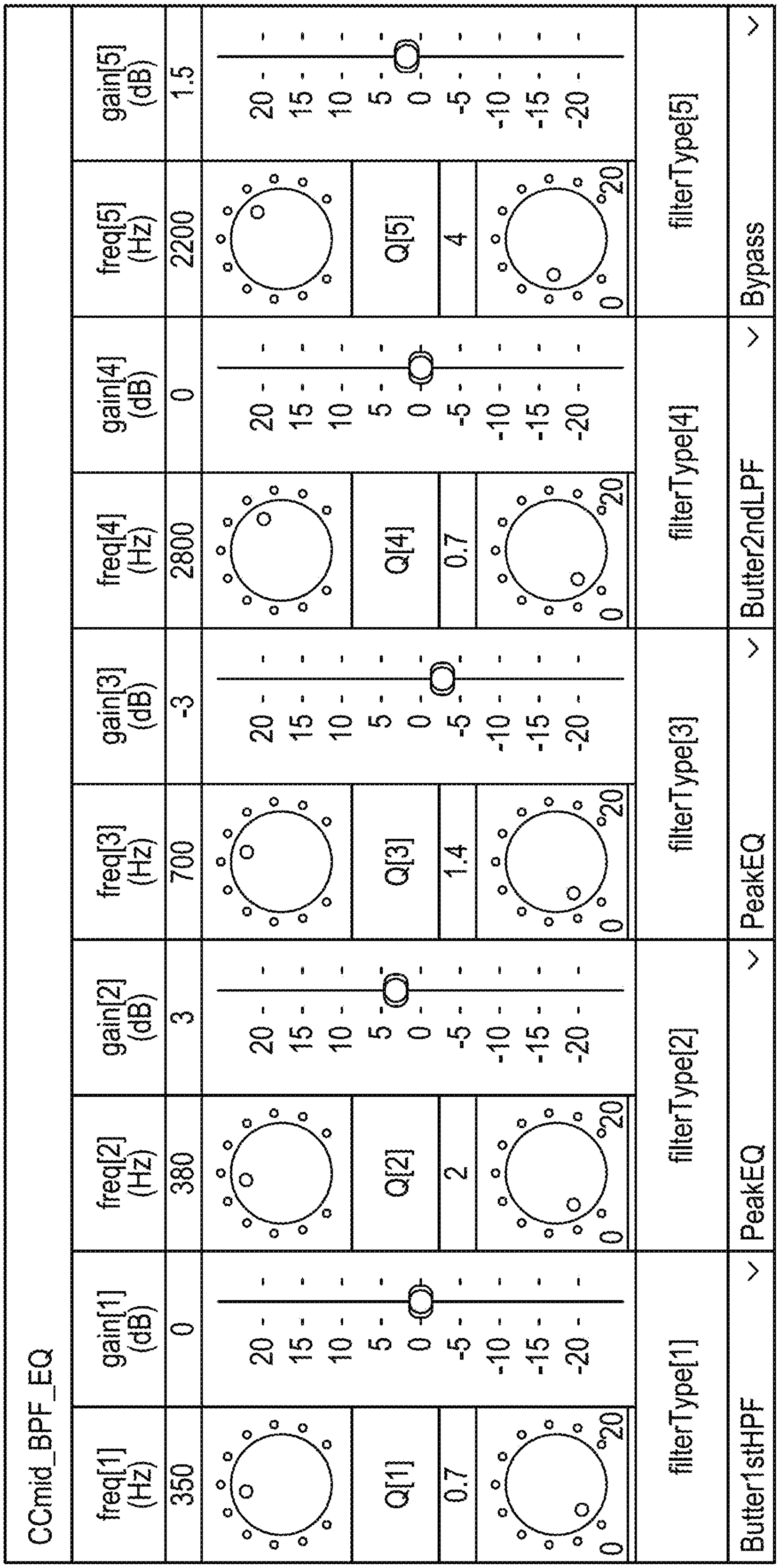
FIG. 4A is a diagram of a Digital Signal Processing ("DSP") design software application illustrating DSP instructions for a loudspeaker system.

FIGS. 4A-6B together show how acoustic SDA (aSDA) and electronic SDA (eSDA) can be accomplished in an illustrated example embodiment of the present disclosure. Electronic SDA (eSDA) can use the same drivers (e.g., L/R side-firing drivers (508L, 508R)) to reproduce both the main signals and delayed SDA effects. FIGS. 4A, 4B and 4C illustrate screen shots of an example DSP programming which may be used in a method or system according to some embodiments. For eSDA, the center mid-bass driver 508C can respond to dedicated FL/FR mixer inputs set to "0" since the L and R mid-bass drivers (e.g. 508L and 508R) reproduce both the main (L and R) projections and SDA effect projections. In FIGS. 5A and 5B, SDA effects are illustrated as the delayed, band-pass filtered and inverted FL and FR channels. They are mixed with FL and FR signals, and then subjected to a similar band-pass filter and other response shaping.

Figure 4B:
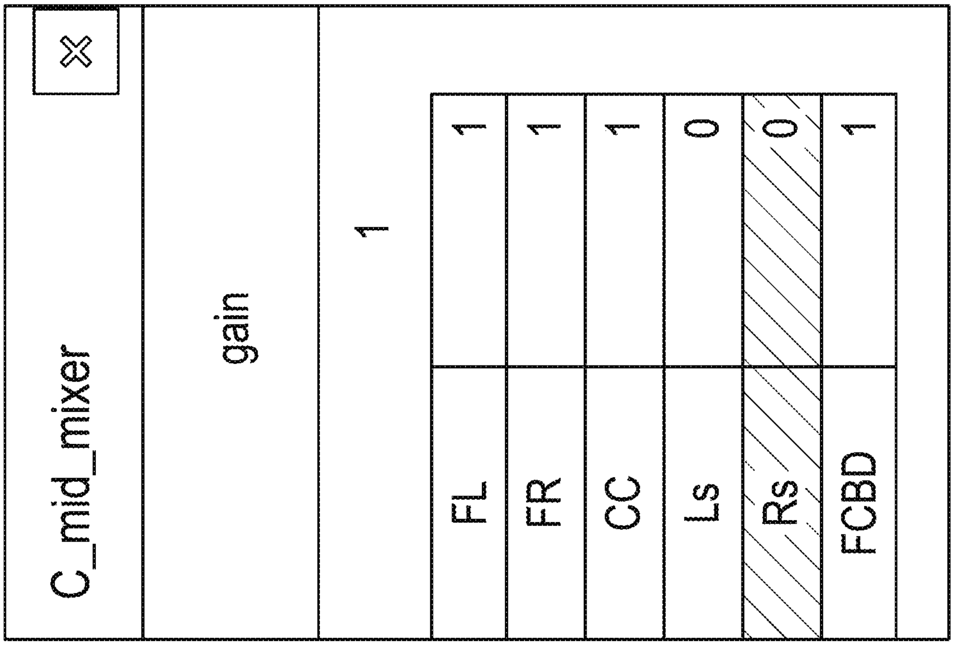
FIG. 4B is a diagram of a Digital Signal Processing ("DSP") design software application illustrating DSP instructions for a loudspeaker system.
Figure 4C:
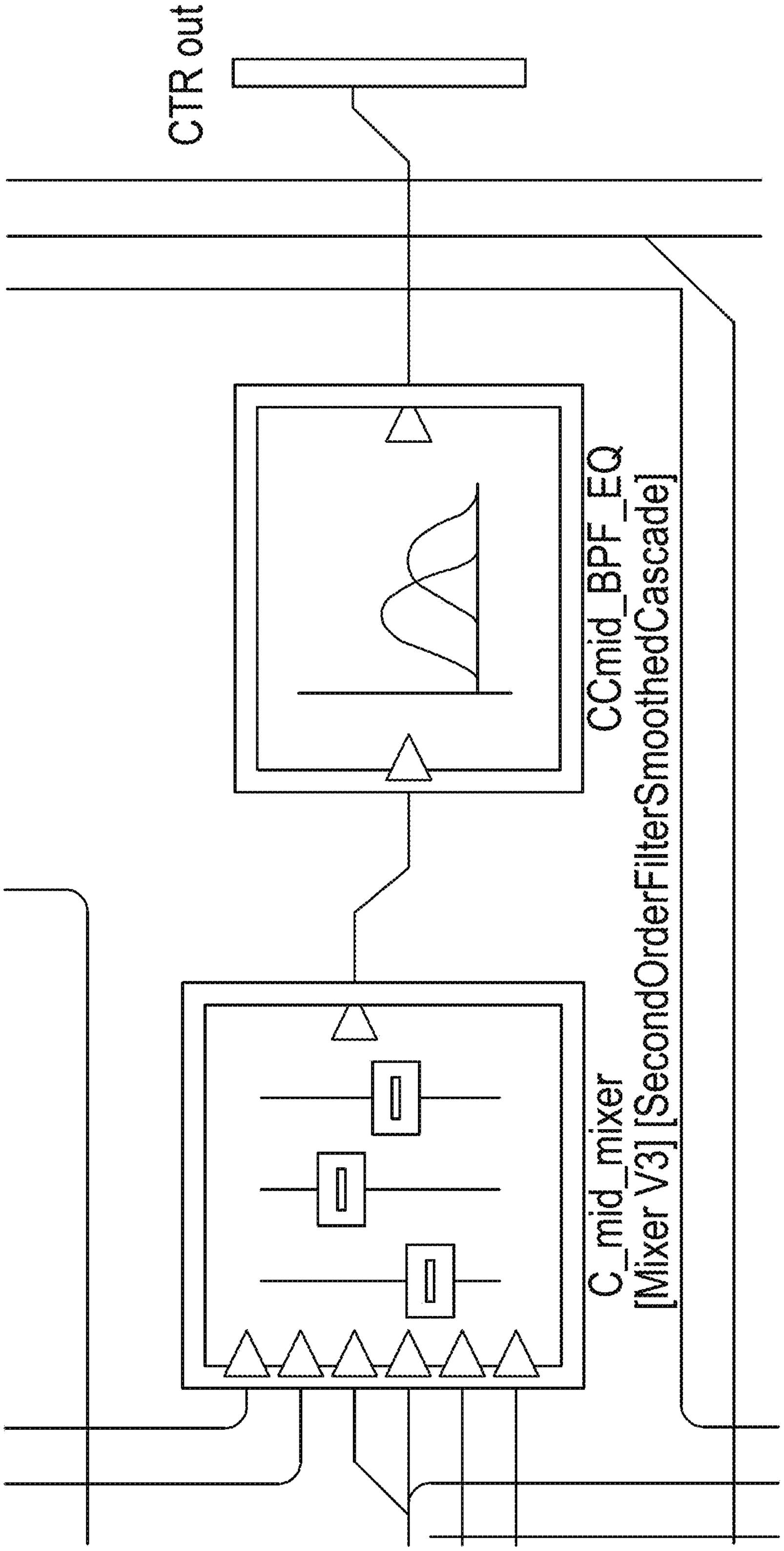
FIG. 4C shows example signal processing features for a loudspeaker system.

Referring specifically to FIGS. 4A, 4B and 4C, the screen shots for programming selected DSP processing blocks are illustrated, and show example 6×1 Mixer settings for center mid-bass transducer 508C. FIG. 4C shows an example that includes a mixer for controlling signals to the center mid-bass driver 508C. The mixer can receive multiple input channels (e.g., front left, front right, center channel, left surround, right surround, and FCBD, or any combination thereof), and can have input parameters associated with the input channels. In some embodiments, some input channels and associated input parameters can be omitted, such as for a stereo pair, a 2.1, a 3.1, or other system configuration. With an input parameter of "1" for example, the mixer can pass the associated input channel to the driver (or for further processing, such as by the band pass filter shown in FIG. 4C). With an input parameter of "0" for example, the mixer can stop or block the associated input channel so that it is not used to drive the transducer (e.g., 508C). FIG. 4B shows an example set of input parameters that can be used by the mixer of FIG. 4C. In the example of FIG. 4B, the settings reflect use of acoustic SDA, for which the mixer input values for the FL and FR channels are set to "1" so that the center driver 508C is driven by the FL and FR channel signals. Additionally, in some embodiments, the center mid-bass driver 508C can reproduce the center channel and/or FCBD signals. For eSDA, the center mid-bass driver's FL/FR mixer inputs can be set to "0" since the L and R mid-bass drivers reproduce both the main and SDA effects. With reference to FIG. 4A, the settings of the 5-band parametric filters/EQ include high-pass (1st order), low-pass (2nd order) filters and two PEQ bands (filter [5] is bypassed).

Figure 5A:
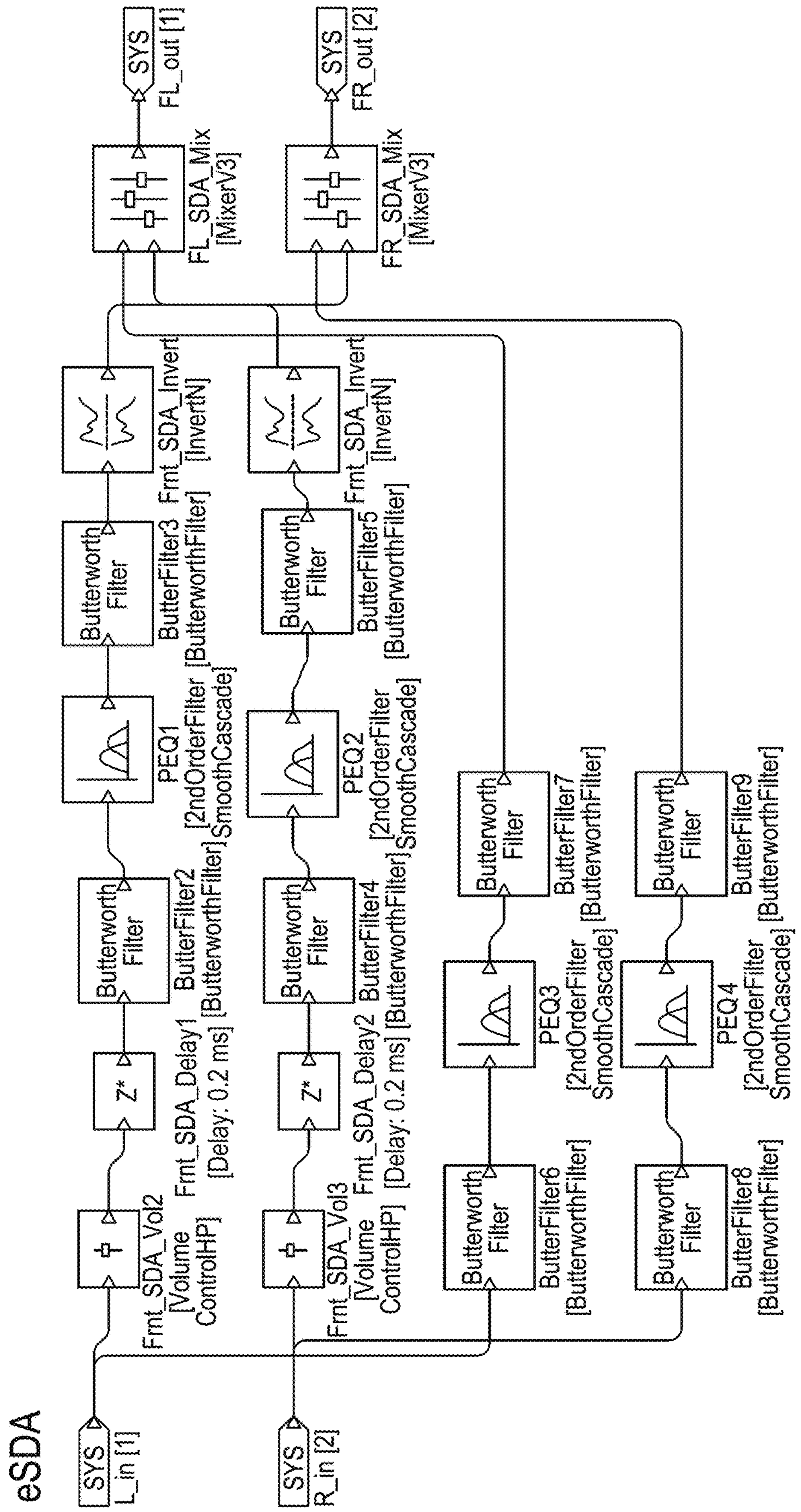
FIG. 5A shows example signal processing features for a loudspeaker system.

Returning to the diagram of FIG. 5A, an example DSP signal flow (module) is illustrated in a diagram showing how SDA effects can be processed, including how delay (eSDA application), is derived and how the signals are filtered. In the DSP block labelled "FL_SDA_Mix", FL and inverted FR (with delay) are combined to generate an FL−FR signal which is reproduced by the Left mid-bass driver 508L. Similarly, the Right mid-bass driver 508R reproduces FR−FL, which can be a combination of FR and inverted FL (with delay) provided by the DSP block labeled "FR_SDA_Mix". While theoretically it might be expected that an optimal SDA delay value would be approximately 10-30 micro-seconds (e.g., based on path length differences for common listening distances), development work has revealed experimentally that a much larger delay provides surprisingly effective results. Thus in some embodiments, "Frnt_SDA_Delay" (FIG. 5A) is selected to be set at approximately 200 uSec (or 0.2 ms) or about one order of magnitude larger than the expected theoretical value. Various other amounts of delay can be used, such as about 0.05 ms, about 0.1 ms, about 0.15 ms, about 0.2 ms, about 0.25 ms, about 0.3 ms, about 0.35 ms, about 0.4 ms, about 0.45 ms, about 0.5 ms, or any values or ranges between any of these values, although other configurations are possible.

Further with regard to eSDA, for example, to create the distinct sound projections or phantom SDA sources (e.g., including the SDA effects), which can be comprised of +/−(L−R) signals as indicated herein, signals can be delayed in accordance with the lag that would occur if actual, dedicated SDA effect transducers were present. In some cases, imposing a delay an order of magnitude or so larger than the theoretical expected value (e.g., based on path length differences), can provide surprisingly effective enhanced spatial widening. As opposed to aSDA in which the center mid-bass driver reproduces L, R and C signals, such as per the settings of C_mid_mixer in FIGS. 4A-4C, for eSDA the C_mid_mixer processing block is set to 0/0/1 for its FL/FR/C inputs.

In FIG. 5A the two 2×1 mixers FL_SDA_Mix and FR_SDA_Mix both are set to 1/1 in order to properly sum the main and (delayed) SDA signals associated with the L/F mid-bass transducers. Acoustic SDA (aSDA) as applied to the speaker configuration 500 can sum or otherwise combine the L and R channels and direct the result to the center located mid-bass driver 508C.

Regarding the implementation of eSDA shown in FIG. 5A, All of the Parametric EQ ("PEQ") settings in blocks PEQ1, PRQ2, PEQ3, PEQ4 can be identical, which can provide optimal SDA performance in some cases. Regarding the Butterworth filter blocks, ButterFilters 2/4=400 Hz, 1st order HPF, ButterFilters 3/5=4500 Hz, 1st order LPF, ButterFilters 6/8=250 Hz, 2nd order HPF, and ButterFilters 7/9=2500 Hz, 2nd order LPF, in some embodiments. Various other filter types and parameters could be used. Delay values for the two blocks identified as "Frnt_SDA_Delay 1" and "Frnt_SDA_Delay 2" can be 0.2 ms, although other delay values could be used as discussed herein. It should be noted that in the illustrated embodiment, the SDA signals are cross-mixed with opposite channel main signals (e.g., "FL_out"=L−R and "FR_out=R−L).

The right driver 508R can be driven at least in part by the right audio signal and/or the left driver 508R can be driven at least in part by the left audio signal such as at frequencies that include at least about 300 Hz, about 350 Hz, about 400 Hz, about 450 Hz, about 500 Hz, about 550 Hz, about 600

Figure 5B:
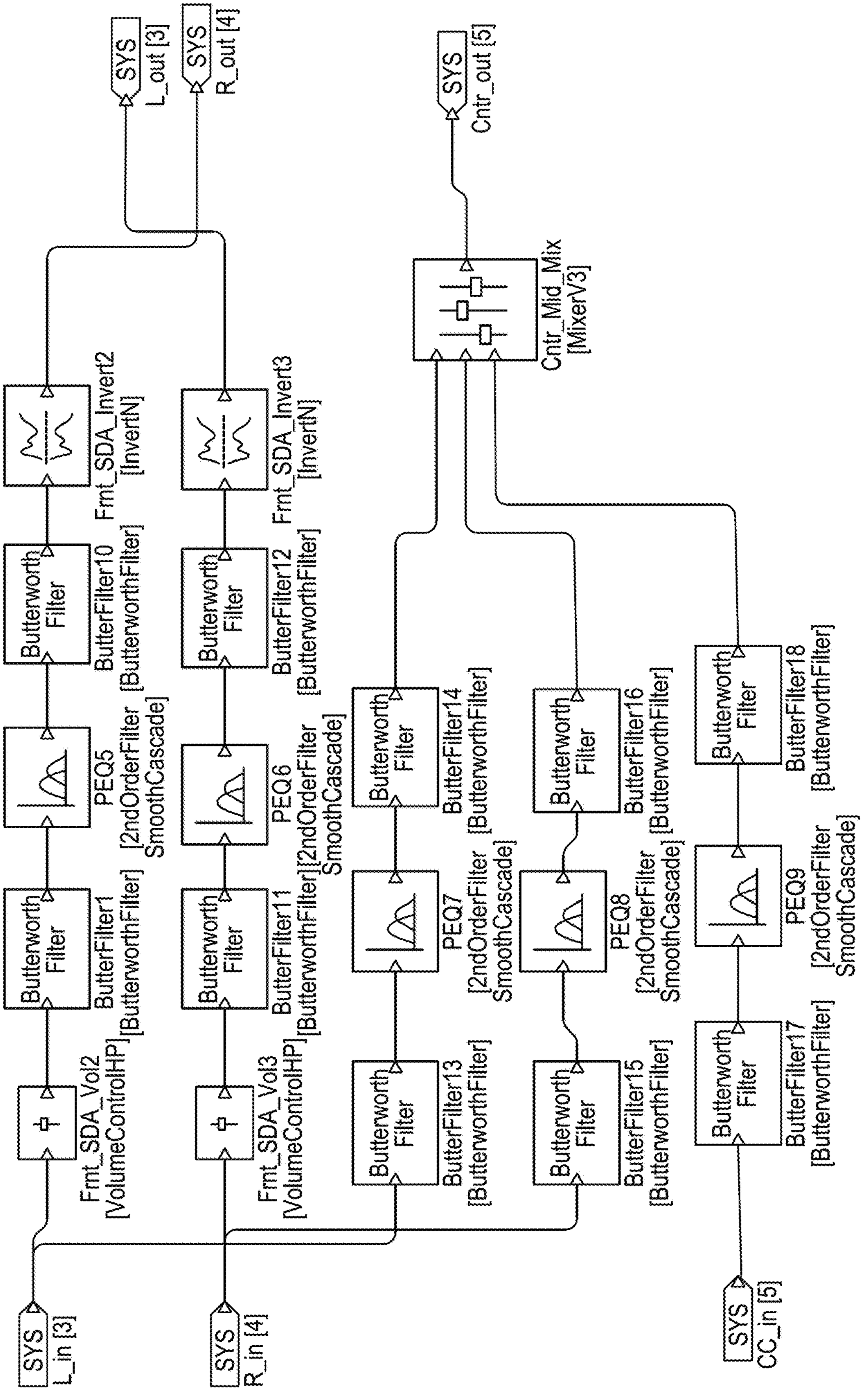
FIG. 5B shows example signal processing features for a loudspeaker system.

Hz, about 650 Hz, about 700 Hz, about 750 Hz, about 800 Hz, or higher, or any values or ranges between any of these values. The crosstalk cancelation signals (e.g., inverted L and/or inverted R) can produce sound at frequencies that include at least the same frequencies listed above. The sounds produced by the right driver 508R from the left crosstalk cancelation signal (e.g., inverted L) can be at frequencies that can substantially cancel the sounds produced by the left driver 508L from the left audio signal. The sounds produced by the left driver 508L from the right crosstalk cancelation signal (e.g., inverted R) can be at frequencies that can substantially cancel the sounds produced by the right driver 508R from the right audio signal.

produced by the right driver 508R (e.g., from the right audio signal) and/or from the left driver 508L (e.g., from the left audio signal) can be at frequencies of sound in the same range as the sounds produced by the Turning next to FIG. 5B, in this example embodiment host system 500 can utilize the lateral L and R mid-bass drivers (508L, 508R) to reproduce undelayed, inverted L and R signals, cross-mixed to the R and L channels. As shown, the center mid-bass driver 508C reproduces L, C and R channels. In some embodiments, the drivers can be configured and positioned so that the inverted L signal can be delivered to the right driver 508R without delay to produce sound that can cancel the L signal from the center driver 508C at the right ear. For example, the center driver 508C and the right driver 508R can be configured to be similarly spaced from the listeners right ear (e.g., within a threshold amount). Similarly, the drivers can be configured and positioned so that the inverted R signal can be delivered to the left driver 508L without delay to produce sound that can cancel the R signal from the center driver 508C at the left ear. For example, the center driver 508C and the left driver 508L can be configured to be similarly spaced from the listeners left ear (e.g., within a threshold amount). In other configurations, the example of FIG. 5B can be modified to include a delay that is applied to the inverted L and inverted R signals (e.g., similar to the delay blocks Z* in FIG. 5A). For example, the right driver 508R and/or left driver 508L could be positioned differently from the example of FIG. 2B (e.g., closer to the center driver 508C), and the crosstalk cancelation signals that are delivered to the right driver 508R and left driver 508L can be delayed in time appropriately so that the crosstalk cancelation sounds reach the right and left ears of the listener at substantially the same time as the corresponding sounds from the center driver 508C. Various amounts of delay could be applied, such as to provide the impression of a wider soundstage or to produce phantom sound projections, according to other example embodiments.

The center driver 508C can be driven at least in part by the left audio signal and the right audio signal (e.g., which can be summed or otherwise combined) such as at frequencies that include at least about 300 Hz, about 350 Hz, about 400 Hz, about 450 Hz, about 500 Hz, about 550 Hz, about 600 Hz, about 650 Hz, about 700 Hz, about 750 Hz, about 800 Hz, or higher, or any values or ranges between any of these values. The crosstalk cancelation signals (e.g., inverted L and/or inverted R) can produce sounds at frequencies that include at least the same frequencies listed above. The sounds produced by the right driver 508R from the left crosstalk cancelation signal (e.g., inverted L) can be at frequencies that can substantially cancel the sounds produced by the center driver 508C from the left audio signal. The sounds produced by the left driver 508L from the right crosstalk cancelation signal (e.g., inverted R) can be at frequencies that can substantially cancel the sounds produced by the center driver 508R from the right audio signal.

In some embodiments, the crosstalk cancelation can be performed for frequencies of about 300 Hz, about 350 Hz, about 400 Hz, about 450 Hz, about 500 Hz, about 550 Hz, about 600 Hz, about 650 Hz, about 700 Hz, about 750 Hz, about 800 Hz, about 900 Hz, about 1000 Hz, about 2 kHz, about 3 kHz, about 4 kHz, about 5 kHz, about 6 kHz, about 7 kHz, about 8 kHz, about 9 kHz, about 10 kHz, or any values or ranges therebetween, although other configurations could be used.

In FIGS. 4A-4C, the example settings for the C_mid_mixer processing are shown. Thus, the "main" or "stereo" components of the FL and FR signals are reproduced by the center mid-bass driver 508C while the L and R mid-bass drivers play the SDA effects as indicated in FIG. 5A.

FIG. 6A shows a simplified diagram illustrating an example aSDA signal processing signal flow for the three driver DSP method of achieving aSDA in accordance with some embodiments. FIG. 6B is a more detailed diagram illustrating a more complicated example embodiment for the DSP implemented in soundbar system 500. Referring initially to FIG. 6A, the DSP method is illustrated and the processing steps to generate Center midbass drive signal 608C for Center midbass driver 508C are arrayed across the top portion of the figure and can include mixing the L and R input signals to generate an L+R signal 600 which is then processed in band pass filter (BPF) and equalization (EQ) section 602C to generate a filtered, equalized L+R signal 604C. That filtered, equalized L+R signal 604C can be then amplified (e.g., in response to user-input responsive volume control signals) (e.g., from remote control 440) to generate Center midbass drive signal 608C for Center midbass driver 508C.

Still following the process illustrated in FIG. 6A, the processing steps to generate the Right midbass drive signal 608R for the Right midbass driver 508R can include applying L input signal to be processed in BPF+EQ section 602LR to generate a filtered, equalized L signal 604L which can be then processed to invert polarity and generate filtered, equalized, and inverted left channel signal which becomes the as yet unamplified Right midbass drive signal 608RU, meaning that the Right midbass driver 508R can be fed a an inverted L signal (e.g., a polarity inverted version of filtered, equalized L signal 604L). That unamplified Right midbass drive signal 608RU can be then amplified (e.g., in response to user-input responsive volume control signals) (e.g., from remote control 440) to generate Right midbass drive signal 608R for Right midbass driver 508R. Analogously, the processing steps to generate the Left midbass drive signal 608L for the Left midbass driver 508L can include applying the R input signal to be processed in BPF+EQ section 602LR to generate a filtered, equalized R signal 604R which can be then processed to invert polarity and generate filtered, equalized, and inverted right channel signal which becomes the as yet unamplified Left midbass drive signal 608LU, meaning that the Left midbass driver 508L can be fed an inverted R signal (e.g., a polarity inverted version of filtered, equalized R signal 604R). That unamplified Left midbass drive signal 608LU can be then amplified (e.g., in response to user-input responsive volume control signals) (e.g., from remote control 440) to generate Left midbass drive signal 608L for Lett midbass driver 508L.

Many variations are possible. For example, the left (L) and right (R) input signals can be combined in various ways to produce the drive signal that is delivered to the center driver 508C. In some cases, the filtering, equalization, and/or amplification can be performed differently or could be omitted entirely. In some embodiments a center channel (C) input (e.g., not shown in FIG. 6A) can be combined with the L and R signals to drive the center driver 508C.

FIG. 6B illustrates a more complex example embodiment of a signal processing method, but one which in some cases still generates the desired drive signals 608C, 608L and 608R. In the example of FIG. 6B, the left (L) and right (R) signals can be combined and delivered to the center mid-bass driver 508C. The L and R signals can each be filtered (e.g., such as by a high pass filter), equalized, filtered (e.g., by a low pass filter), and the processed L and R signals can then be combined, such as by a 2×1 mixer. The combined signal can be amplified (e.g., according to a volume setting) in some embodiments. The L+R signal can be delivered to the center driver 508C. In some cases, a center (C) signal can be delivered to the center mid-bass driver. A combined L+R+C signal can be produced and can be provided to the driver 508C. For example, a 3×1 mixer can be used (e.g., in place of the 2×1 mixer in FIG. 6B) to combine the processed L and R signals shown in FIG. 6B along with a center channel signal (C), which in some cases can also be similarly processed (e.g., filtered and equalized).

The L signal can be inverted and the inverted L signal can then be delivered to the right mid-bass driver 508R, and the R signal can be inverted and the inverted R signal can be delivered to the left mid-bass driver 508L. In some embodiments, the L and R signals can be processed (e.g., before or after inversion), such as by a high pass filter, an equalizer, a low pass filter, and an attenuator. The processed and inverted R and L signals (−R and −L) can be amplified (e.g., according to a volume setting) and the −R signal can be used to drive the left driver 508L, whereas the −L signal can be used to drive the right driver 508R. The −R and −L signal can be attenuated, so that the inverted effect sounds (−L and −R) produced by the left and right drivers 508L and 508R are quieter than the main L+R sound produced by the center driver 508C.

In some embodiments, the L signal (e.g., the processed +L signal generated for the center driver) can also be delivered to the left driver 508L, and the R signal (e.g., the processed +R signal generated for the center driver) can also be delivered to the right driver 508R. For example, a 2×1 mixer can combine the inverted −R signal with the +L signal, and that combined signal can be delivered to the left driver 508L (e.g., after amplification). Similarly, a 2×1 mixer can combine the inverted −L signal with the +R signal, and that combined signal can be delivered to the right driver 508R (e.g., after amplification). The right driver 508C can receive an R−L signal, and the left driver 508L can receive an L−R signal.

In some cases, the +L and +R signals that are delivered to the left driver 508L and the right driver 508R can be attenuated, such as by an amount more than the attenuation applied to the −L and −R signals, such as about 2 times the attenuation, about 3 times the attenuation, about 4 times the attenuation, about 5 times the attenuation, about 6 times the attenuation, about 7 times the attenuation, about 8 times the attenuation, about 9 times the attenuation, about 10 times the attenuation, about 11 times the attenuation, about 12 times the attenuation about 13 times the attenuation, about 14 times the attenuation, about 15 times the attenuation, or any values or ranges therebetween, although other amounts of attenuation could be applied.

Some embodiments can improve the perceived SDA sonic image width and stability, which in some cases can produce other undesirable effects for listeners, as discussed herein. Some embodiments can perform "2nd order correction" which represents an improvement over 1st order SDA processing. Some embodiments described herein include generating four sound projections for Stereo SDA (LSS, L, R and RSS, as shown in FIG. 3B), such as from three mid-bass drivers (508L, 508C and 508R). In the example enhanced signal processing method illustrated in FIG. 7, six sound projections can be realized for Stereo SDA. The sound projections comprise:

(1) SDA-L2,
(2) SDA-L (which is sometimes referred to herein as LSS),
(3) L (the main left channel sound projection, as discussed herein),
(4) R (the main right channel sound projection, as discussed herein),
(5) SDA-R (which is sometime referred to herein as RSS), and
(6) SDA-R2.

The sound projections on the left side and/or on the right side can be spaced apart by distances that approximate the distance between the ears of the listener (e.g., similar to the spacing "W" discussed herein), which can facilitate interaural crosstalk cancelation. The distance "W" can be about 7.5 to about 8.0 inches in some cases. The distance "W" can be about 12 cm, about 15 cm, about 18 cm, about 20 cm, about 22 cm, about 25 cm, about 28 cm, or any values or ranges therebetween, although other spacing could be used. The L and R sound projections can be spaced apart by a distance larger than "W" in some implementations. The sound projection SDA-R can be spaced laterally to the right from the sound projection R by a distance of about W. The sound projection SDA-R2 can be spaced laterally to the right from the sound projection SDA-R by a distance of about W. The sound projection SDA-L can be spaced laterally to the left from the sound projection L by a distance of about W. The sound projection SDA-L2 can be spaced laterally to the left from the sound projection SDA-L by a distance of about W. In some embodiment, delay can be applied to the signals producing the SDA-L2 and SDA-R2 sound projections.

The six sound projections may be created in the user's listening space from 6 drivers, or fewer drivers. In some cases, each of the 6 sound projections can be produced by a separate driver, and the drivers can be positioned at the locations of the sound projections with the spacing discussed herein. In other embodiments, some or all of the sound projections can be phantom sound projections, which can be produced psycho-acoustically, such as at the locations with the spacing discussed above. Optionally, the six sound projections illustrated in FIG. 7 may be created in the user's listening space from a system with the three mid-bass drivers described above, (e.g., 508L, 508C and 508R), or by a system with four drivers such as disclosed in connection with FIGS. 1B and 1C. One or more of the phantom sound projections can be generated psycho-acoustically, with appropriately timed delays and/or attenuated signals.

The improvement over the first-order SDA methods described herein addresses SDA's secondary artifacts. While SDA signals can be used to substantially cancel interaural crosstalk (e.g., for the sounds of main left and right channels), there can be unintended secondary effects that occur due to the Inter Aural Crosstalk ("IAC") associated with the first order SDA signals. As shown in FIG. 7, the main left sound projection (L) can produce a main sound signal L/L that is received at the left ear, as well as an interaural crosstalk sound signal L/R that is received at the right ear. The main right sound projection (R) can produce a main sound signal R/R that is received at the right ear, as well as an interaural crosstalk signal R/L that is received at the left ear. The SDA-L sound projection can produce an SDA-L/L signal that is received at the left ear to cancel the interaural crosstalk signal R/L. The position of the SDA-L sound projection can be configured to provide the SDA-L/L signal to the left ear at the same time as the R/L interaural crosstalk signal. The SDA-R sound projection can produce an SDA-R/R signal that is received at the right ear to cancel the interaural crosstalk signal L/R. The position of the SDA-R sound projection can be configured to provide the SDA-R/R signal to the right ear at the same time as the L/R interaural crosstalk signal. The first order SDA signals SDA-L/L and SDA-R/R can effectively reach the listener's Left and Right ears respectively in a direct manner, thereby cancelling interaural crosstalk signals L/R and R/L. However, there can be undesired secondary artifacts of the first order SDA signals, shown (in FIG. 7) as SDA-L/R and SDA-R/L, which respectively are the crosstalk signal associated with the first order SDA signals SDA-L/L and SDA-R/R. The SDA-L sound projection can produce a first-order SDA interaural crosstalk signal SDA-L/R that is received at the right ear. The SDA-R sound projection can produce a first-order SDA interaural crosstalk signal SDA-R/L that is received at the left ear.

Experimental work has revealed that significant improvements in spatial widening may be realized by cancelling these unintended secondary IACC signals (SDA-L/R and SDA-R/L). The SDA signals can be determined by +/−(L−R) (or sometimes simply inverted L or R signals (e.g., −L or −R)) difference signals with appropriate magnitude shaping and attenuation. In experimental work, it was noted that Secondary SDA signals, intended to cancel the first order SDA interaural crosstalk signals (e.g., SDA-L/R and SDA-R/L), may also be composed of difference or inverted signals. A listener's left ear may improperly hear SDA-R/L and that content can be delayed relative to SDA-R/R by a time lag proportional to the path length difference between an IAC path (such as SDA-R/L) and the direct path of a same-side SDA effects signal, such as SDA-R/R. Inverted, properly delayed SDA-R/L and SDA-L/R signals can respectively cancel first order SDA IAC. These secondary cancelation signals may be expressed as "minus (−L)" and "minus(−R)" or simply +L and +R. They may be appropriately attenuated and delayed. The SDA-L2 sound projection can produce an SDA-L2/L signal that is received at the left ear to cancel the first order SDA interaural crosstalk signal SDA-R/L. The position of the SDA-L2 sound projection can be configured to provide the SDA-L2/L signal to the left ear at the same time as the SDA-R/L interaural crosstalk signal. The SDA-R2 sound projection can produce an SDA-R2/R signal that is received at the right ear to cancel the first order SDA interaural crosstalk signal SDA-L/R. The position of the SDA-R2 sound projection can be configured to provide the SDA-R2/R signal to the right ear at the same time as the SDA-L/R interaural crosstalk signal.

Figure 7:
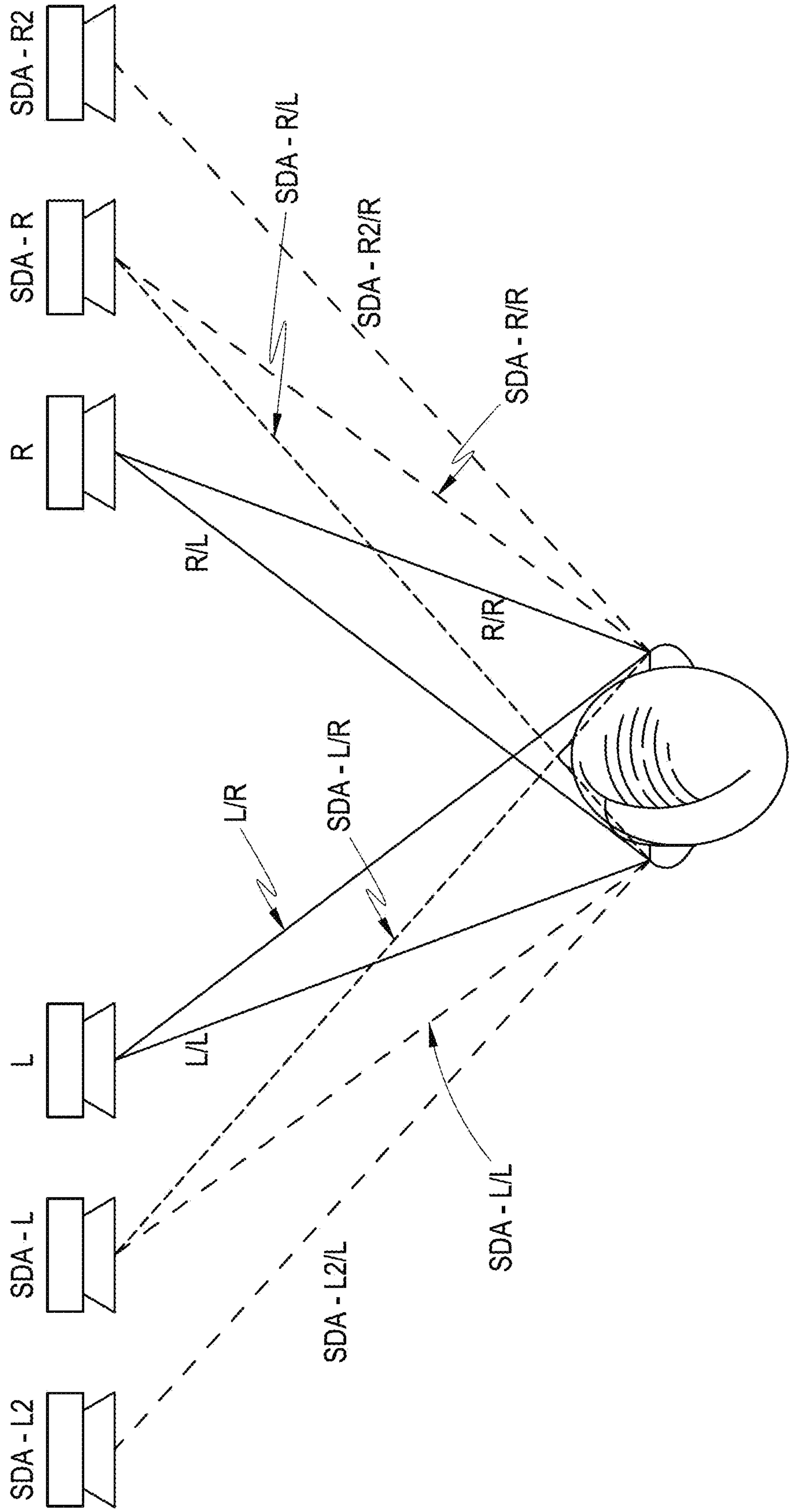
FIG. 7 is a diagram showing sound projections for a loudspeaker system in a listening space.

Although not shown in FIG. 7, the SDA-L2 and SDA-R2 sound projections can produce secondary SDA interaural crosstalk signals SDA-L2/R and SDA-R2/L, which can be canceled by tertiary SDA signals (e.g., produced by additional sound projections SDA-L3 and SDA-R3 that can be spaced laterally outward from the illustrated sound projections). While tertiary and subsequent IACC signals can also be present and may be addressed in a recursive manner, dealing with secondary IACC artifacts can substantially eliminate unintended or undesired IACC effects, thereby dramatically improving spatial widening.

While the delay, generally dependent upon listening distance, theoretically should be approximately 10-30 microseconds, setting the secondary IACC signals to have a longer delay (e.g., which can be an order of magnitude larger than the expected theoretical value) can be surprisingly effective. Various amounts of delay can be used for the SDA-L2/L and SDA-R2/R signals, such as about 0.05 ms, about 0.1 ms, about 0.15 ms, about 0.2 ms, about 0.25 ms, about 0.3 ms, about 0.35 ms, about 0.4 ms, about 0.45 ms, about 0.5 ms, or any values or ranges between any of these values, although other configurations are possible.

Returning to FIG. 7, those unintended IACC signals that reach a listener's opposite side ears (e.g., indicated by SDA-R/L and SDA-L/R), can undesirably degrade the SDA sonic image widening effects. In an example embodiment of the signal processing method, the undesirable effects of those unintended IACC signals are ameliorated by creating two new sonic projections comprising further delayed second order IACC signals from virtual sources SDA-L2 and SDA-R2 which play inverted (SDA-L/R) and (SDA-R/L) respectively signals, or simply L and R signals (e.g., with appropriate attenuation of 6-12 dB). In principle, tertiary and further unintended IACC effects may be addressed similarly.

A compact system 500 with SDA system implementing the embodiments illustrated in FIGS. 2A-7 includes a combination of features, including, for example compact loudspeaker system or product 500 implementing an enhanced Stereo Dimensional Array ("SDA") effect in a listener's space, said SDA effect including the generation, in the listener's space of (a) a stereo left main channel sound projection, (b) a stereo right main channel sound projection, (c) a stereo left side SDA effect crosstalk cancelation sound projection, and (d) a stereo right side SDA effect crosstalk cancelation sound projection, said system comprising:

(a) a first or left mid-woofer transducer (e.g., 508L), a second or center mid-woofer transducer (e.g., 508C) and a third or right mid-woofer transducer (e.g., 508R), said first, second and third mid-woofer transducers being spaced equidistantly from one another by a selected inter-driver spacing $D_{IDS}$ and aligned along a Speaker Axis SA configured for use when bisected by a perpendicular listening axis LA that also intersects said listening location in said listening space;

(b) said first or left mid-woofer transducer (e.g., 508L) being aimed leftwardly to the side at a selected acute angle (e.g., in the range of 40-70 degrees from the listening axis LA, toward the speaker axis SA) driven by a Left Stereo+SDA signal 608L which is generated from a filtered, equalized and selectively amplified or attenuated and inverted version of a Right channel input signal;

(c) said second or center mid-woofer transducer (e.g., 508C) being driven by a Center signal 608C which is generated from a selectively amplified or attenuated filtered, equalized version of a Left channel input signal and a filtered, equalized version of a Right channel input signal;

(d) said third or right mid-woofer transducer (e.g., 508R) being aimed rightwardly to the right side at a selected acute angle (e.g., in the range of 40-70 degrees from the listening axis LA, toward the speaker axis SA) driven by a Right Stereo+SDA signal 608R which is generated from a filtered, equalized and selectively amplified or attenuated and inverted version of a Left channel input signal.

Figure 2D:
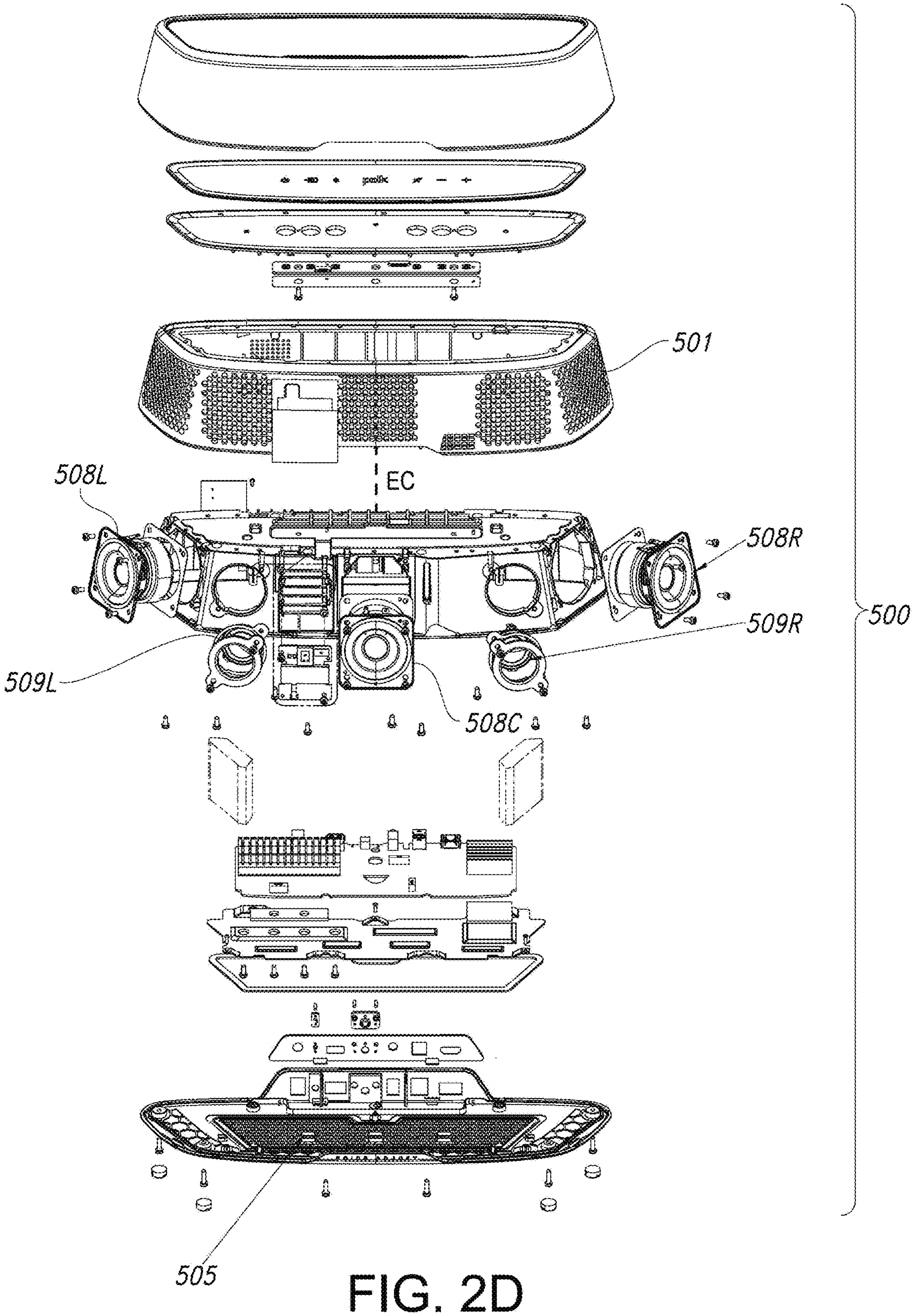
FIG. 2D shows an exploded view of the example compact single-enclosure multi-channel loudspeaker system of FIG. 2A.

In the example embodiments illustrated in FIGS. 2B, 2D and 3B, the Loudspeaker or soundbar system 500 further includes a compact housing (e.g., 501) configured to align and aim said first, second and third mid-woofers in an array designated L–C–R along said speaker axis SA, and arranged symmetrically, with said Center second mid-woofer (e.g., 508C or "C") being centrally located within said compact housing and aimed forwardly, along said listening axis LA. In addition, the first, second and third mid-woofers (e.g., 508L, 508C and 508R) can each be configured to radiate sound from their respective acoustic centers (AC-L, AC-R and AC-C (which is axially aligned with "EC" and the listening axis LA)) and said L–C–R array is aligned along the speaker axis SA with the first mid-woofer (e.g., 508L) spaced from the second mid-woofer (e.g., 508C) along that speaker axis by an L–C inter-driver spacing $D_{IDS}$ defined by a lateral spacing or distance separating the acoustic centers of the first mid-woofer and the second mid-woofer, where that L–C inter-driver spacing is in the range of about 150 mm to about 180 mm (e.g., preferably approximately 165 mm, as shown in FIG. 2B).

In the illustrated embodiments, each of the mid-woofer transducers (e.g., 508L, 508C and 508R) comprise 2 inch, mid-bass or mid-woofer electrodynamic drivers or transducers with a nominal impedance of four ohms. The tweeters (509L, 509R, can be 19 mm dome tweeters, and all of these drivers can be driven by dedicated solid state amplifiers configured within one or more PC boards mounted within housing 501 (or other suitable circuitry), along with electrical connections to signal receiving inputs for stereo Left and right signals as well as home theater input signals (e.g., for Dolby 5.1) preferably received as an input bitstream. A display can be included and circuitry for receiving and processing inputs from a user's handheld remote control 440 can be included. All of these elements can be configured for wired or wireless connection to the system's subwoofer 420.

An advantage of system 400 and particularly soundbar system 500 as illustrated in FIGS. 2A-7 in comparison to a conventional 2.0 (phantom center) soundbar is that its center located driver (508C) when used for reproducing the center channel in a Dolby or DTS 5.1 mix (for example), eliminates the prior art's comb-filtering effects (e.g., as seen by comparing FIG. 1F to FIG. 3B), especially for an off-axis listener due to constructive and destructive interference which generate the uneven magnitude response issues that arise when a multitude (two or more) of laterally displaced audio transducers reproduce the same audio signal. In such situations (e.g., as shown in FIG. 1F), the off-axis amplitude response of a conventional 2.0 soundbar can produce peaks and notches. In comparison, the illustrated embodiments 500 (e.g., as shown in FIG. 3B) can afford a relatively smooth acoustic magnitude response over a wider listening window.

In some embodiments, the transducer configuration of the example soundbar system 500 provides four sound projections (e.g., Left, Left SDA effect, Right and Right SDA effect sound reproduction) in a listener's space, but from only three (not four) mid-bass drivers, and relies upon the newly developed DSP signal flow and method illustrated in FIGS. 4A-6B to provide the Left and Right Stereo and Left side and right side SDA acoustic spatial widening (and IACC) effects. The Front Left ("FL") and Front Right ("FR") signals can be processed using band-pass filters (e.g., comprised of serial high-pass and low-pass filters) which can operate on all three of the mid-bass drivers (508L, 508C, 508R) in the system. Low pass filters can function in concert with the high pass filters applied to first and second tweeters (509L, 509R) which can cover the upper three octaves of the audio passband (e.g., approximately 2.5-20 kHz) while high pass filters can be used above the mixed mono bass signal that is reproduced by all of the drivers. A signal processing system, such as a version of Polk Audio's Full Complement Bass Drive™ signal processing ("FCBD"), can cause all of the mid-bass transducers (508L, 508C, 508R) to reproduce a substantially identical monophonic bass mix, thereby avoiding interchannel phase deviations which could otherwise lead to driver "unloading", over-excursion and/or distortion.

In some embodiments, the SDA effect can be accomplished in part by (a) a physical acoustic alignment sometimes referred to herein as "acoustic SDA" (aSDA), and/or (b) by electronic (e.g., digital) signal processing sometimes referred to herein as "electronic SDA" (eSDA). The latter (eSDA) can use Left and Right side side-firing drivers (508L and 508R) to reproduce both the main signals and delayed SDA effects. For eSDA, the center mid-bass driver's DSP FL/FR mixer inputs can be set to "0" since the L and R mid-bass drivers reproduce both the main and SDA effects. SDA effects can be the delayed, band-pass filtered and inverted FL and FR channels. They can be mixed with FL and FR signals, and can be subjected to a similar band-pass filter and other response shaping. In the DSP block "FL_SDA_Mix", FL and inverted FR (e.g., with delay) are combined to generate an FL–FR signal which is reproduced by the Left mid-bass driver. Similarly, the Right mid-bass driver reproduces FR–FL. As noted above, theoretically, it might be expected that an optimal SDA value would be approximately 10-30 micro-seconds for common listening distances, but experimentally it has been determined that setting "Frnt_SDA_Delay" to higher values, such as approximately 200 uSec (or 0.2 ms) which can be one order of magnitude larger than the expected value, can be surprisingly effective.

Further with regard to eSDA, to create phantom SDA sources, the SDA effects, comprised of +/–(L–R) signals, the SDA signals can be delayed in accordance with the lag that would occur if actual, dedicated SDA effect transducers were present. In some embodiments, imposing a delay an order of magnitude or so larger than the theoretical expected value provides surprisingly effective enhanced spatial widening, as discussed herein.

Acoustic SDA (aSDA) as applied in the speaker configuration of some embodiments, may include summing the L and R channels and directing the result to the center-located mid-bass driver. The associated DSP can include selected settings for a DSP block entitled "C_mid_mixer (described herein). Thus, the "main" or "stereo" components of the FL and FR signals are reproduced by the center mid-bass driver while the Left and Right side side-firing ("L and R") mid-bass drivers play the SDA effects. For aSDA, the DSP processing can use dedicated "mixer" blocks programmed for each channel such that the main component of the FL and FR signals are muted and the SDA effects are unattenuated in each mixer.

Referring again to FIG. 7, the improvement over the first-order SDA methods described herein addresses observed secondary artifacts from what are now considered first order SDA processing. While SDA signals can substantially cancel interaural crosstalk, there can be unintended secondary effects that occur due to the Inter Aural Crosstalk ("IAC") associated with the first order SDA signals. First order SDA signals SDA-L/L and SDA-R/R effectively reach the listener's Left and Right ears respectively in a direct manner, thereby cancelling interaural crosstalk signals L/R and R/L. However, there remains secondary artifacts of the first order SDA signals, shown as SDA-L/R and SDA-R/L, which respectively are the crosstalk signal associated with the first order SDA signals SDA-L/L and SDA-R/R. Significant improvements in spatial widening may be realized by cancelling these unintended secondary IACC signals. In some embodiments, SDA signals are substantially determined by +/−(L−R) (or sometimes simply inverted L or R signals) difference signals with appropriate magnitude shaping and attenuation. Secondary SDA signals, intended to cancel the first order SDA signals, can also be composed of difference or inverted signals. A listener's left ear can improperly hear SDA-R/L and that content will be delayed relative to SDA-R/R by a time lag corresponding to the path length difference between an IAC path (such as SDA-R/L) and the direct path of a same-side SDA effects signal such as SDA-R/R. Inverted, properly delayed SDA-R/L and SDA-L/R signals will respectively cancel first order SDA IAC. These secondary cancelation signals may be expressed as "minus (−L)" and "minus(−R)" or simply +L and +R. They can be appropriately attenuated and delayed, such as to arrive at the ear at the same time as the signal being canceled. While tertiary and subsequent IACC signals are also present and may be addressed in a recursive manner, dealing with secondary IACC artifacts can substantially eliminate unintended IACC thereby dramatically improving spatial widening. While the required delay, generally dependent upon listening distance, theoretically should be approximately 10-30 microseconds, setting the secondary IACC signals to have more delay, as discussed herein, (e.g., an order of magnitude larger in some cases) is surprisingly effective, especially given the system's compact size. Having described embodiments of a new and improved system and signal processing method, it is believed that other modifications, variations and changes will be suggested to those skilled in the art in view of the teachings set forth herein. It is therefore to be understood that all such variations, modifications and changes are believed to fall within the scope of the present disclosure.

Although various embodiments are discussed herein in connection with mid-bass or mid-woofer drivers, it will be understood that any suitable drivers or transducer could be used of various types, including bass drivers, tweeters, subwoofers, etc. Although various embodiments are discussed in connection with production of SDA signals, in some cases the SDA terminology can be omitted and signals can be referenced without the "SDA" label. Although various embodiments are discussed herein in connection with soundbars and compact loudspeaker systems, various aspects of the disclosure can be implemented on other types of speaker systems, such as larger scale speaker systems, such as having separate speaker units for the left, right, and/or center drivers, or with passive speakers where an appropriate driver is implemented to provide suitable signals to the speakers.

Additional Information

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows 11, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A loudspeaker system comprising:

a left transducer;

a middle transducer, wherein the left transducer is offset from the middle transducer in a left direction substantially perpendicular to a longitudinal axis of the middle transducer;

a right transducer, wherein the right transducer is offset from the middle transducer in a right direction substantially opposite the left direction;

signal processing electronics configured to:

receive a left audio signal;

receive a right audio signal;

generate a left crosstalk cancelation signal, the left crosstalk cancelation signal comprising an inverted instance of the left audio signal;

generate a right crosstalk cancelation signal, the right crosstalk cancelation signal comprising an inverted instance of the right audio signal;

drive the left transducer based at least in part on the right crosstalk cancelation signal;

drive the middle transducer based at least in part on the left audio signal and the right audio signal at frequencies above about 600 Hz; and drive the right transducer based at least in part on the left crosstalk cancelation signal.

2. The loudspeaker system of claim 1, wherein the signal processing electronics are configured to:

drive the left transducer to produce sound that is configured to at least partially cancel sound from the middle transducer associated with the right audio signal at a listener's left ear; and drive the right transducer to produce sound that is configured to at least partially cancel sound from the middle transducer associated with the left audio signal at the listener's right ear.

3. The loudspeaker system of claim 1, wherein the signal processing electronics are configured to:

receive a center audio signal; and drive the middle transducer based at least in part on center audio signal in addition to the left audio signal and the right audio signal.

4. The loudspeaker system of claim 1, wherein the signal processing electronics are configured to:

drive the left transducer based at least in part on the left audio signal and the right crosstalk cancelation signal; and drive the right transducer based at least in part on the right audio signal and the left crosstalk cancelation signal.

5. The loudspeaker system of claim 1, wherein the signal processing electronics are configured to:

provide the left crosstalk cancelation signal with a first time delay relative to the left audio signal; and provide the right crosstalk cancelation signal with a second time delay relative to the right audio signal.

6. The loudspeaker system of claim 5, wherein the first time delay and the second time delay have a duration between about 0.1 ms and about 0.3 ms.

7. The loudspeaker system of claim 1, wherein the signal processing electronics are configured to drive the left transducer, the middle transducer, and the right transducer so as to produce sound at a listening location that is configured to be perceived by a listener as coming from a phantom sound source at a location that is spaced apart from the left transducer, the middle transducer, and the right transducer.

8. The loudspeaker system of claim 1, wherein the signal processing electronics are configured to:

generate a second-order left crosstalk cancelation signal that comprises an inverted instance of the left crosstalk cancelation signal;

generate a second-order right crosstalk cancelation signal that comprises an inverted instance of the right crosstalk cancelation signal;

drive the left transducer based at least in part on the right crosstalk cancelation signal and the second-order left crosstalk cancelation signal; and drive the right transducer based at least in part on the left crosstalk cancelation signal and the second-order right crosstalk cancelation signal.

9. The loudspeaker system of claim 1, comprising a soundbar with a housing, wherein the left transducer, the middle transducer, and the right transducer are contained within the housing of the soundbar.

10. A loudspeaker system comprising:

a left transducer;

a right transducer;

signal processing electronics configured to:

receive a left audio signal;

receive a right audio signal;

generate a left crosstalk cancelation signal, the left crosstalk cancelation signal comprising an inverted and time delayed instance of the left audio signal;

generate a right crosstalk cancelation signal, the right crosstalk cancelation signal comprising an inverted and time delayed instance of the right audio signal;

drive the left transducer based at least in part on the left audio signal and the right crosstalk cancelation signal; and drive the right transducer based at least in part on the right audio signal and the left crosstalk cancelation signal.

11. The loudspeaker system of claim 10, wherein the signal processing electronics are configured to:

drive the left transducer to produce sound that is configured to at least partially cancel sound from the right transducer associated with the right audio signal at a listener's left ear; and drive the right transducer to produce sound that is configured to at least partially cancel sound from the left transducer associated with the left audio signal at the listener's right ear.

12. The loudspeaker system of claim 10, further comprising a middle transducer positioned between the left transducer and the right transducer.

13. The loudspeaker system of claim 11, wherein the signal processing electronics are configured to:

receive a center audio signal; and drive the middle transducer based at least in part on center audio signal.

14. The loudspeaker system of claim 10, wherein the signal processing electronics configured to driver the drive the left transducer based at least in part on the left audio signal and the right crosstalk cancelation signal and to drive the right transducer based at least in part on the right audio signal and the left crosstalk cancelation signal at frequencies above about 600 Hz.

15. The loudspeaker system of claim 10, wherein the left crosstalk cancelation signal and the right crosstalk cancelation signal have a time delay that is between about 0.1 ms and about 0.3 ms.

16. The loudspeaker of claim 10, wherein the signal processing electronics are configured to drive the left transducer and the right transducer so as to produce sound at a listening location that is configured to be perceived by a listener as coming from a phantom sound source at a location that is spaced apart from the left transducer and the right transducer.

17. The loudspeaker of claim 10, wherein the signal processing electronics are configured to:

generate a second-order left crosstalk cancelation signal that comprises an inverted instance of the left crosstalk cancelation signal;

generate a second-order right crosstalk cancelation signal that comprises an inverted instance of the right crosstalk cancelation signal;

drive the left transducer based at least in part on the right crosstalk cancelation signal and the second-order left crosstalk cancelation signal; and drive the right transducer based at least in part on the left crosstalk cancelation signal and the second-order right crosstalk cancelation signal.

18. The loudspeaker system of claim 10, comprising a soundbar with a housing, wherein the left transducer and the right transducer are contained within the housing of the soundbar.

19. A loudspeaker system comprising:

a left transducer;

a right transducer;

signal processing electronics configured to:

receive a left audio signal;

receive a right audio signal;

generate a left crosstalk cancelation signal, the left crosstalk cancelation signal comprising an inverted and time delayed instance of the left audio signal;

generate a right crosstalk cancelation signal, the right crosstalk cancelation signal comprising an inverted and time delayed instance of the right audio signal;

generate a second-order left crosstalk cancelation signal that comprises an inverted instance of the left crosstalk cancelation signal;

generate a second-order right crosstalk cancelation signal that comprises an inverted instance of the right crosstalk cancelation signal;

drive the left transducer based at least in part on the right crosstalk cancelation signal and the second-order left crosstalk cancelation signal; and drive the right transducer based at least in part on the left crosstalk cancelation signal and the second-order right crosstalk cancelation signal.

20. The loudspeaker system of claim 19, wherein the signal processing electronics are configured to:

provide the second-order left crosstalk cancelation signal with a first time delay relative to the left crosstalk cancelation signal; and provide the second-order right crosstalk cancelation signal with a second time delay relative to the right crosstalk cancelation signal.

21. The loudspeaker system of claim 20, wherein the first time delay and the second time delay have a duration between about 0.1 ms and about 0.3 ms.

22. The loudspeaker system of claim 19, wherein the signal processing electronics are configured to:

drive the left transducer based at least in part on the left audio signal, the right crosstalk cancelation signal, and the second-order left crosstalk cancelation signal; and drive the right transducer based at least in part on the right audio signal, the left crosstalk cancelation signal, and the second-order right crosstalk cancelation signal.

23. The loudspeaker system of claim 19, further comprising a middle transducer positioned between the left transducer and the right transducer, wherein the signal processing electronics are configured to drive the middle transducer based at least in part on the left audio signal, the right audio signal, and the center audio signal.

24. The loudspeaker system of claim 19, wherein the signal processing electronics are configured to drive the left transducer and the right transducer so as to produce sound at a listening location that is configured to be perceived by a listener as coming from a phantom sound source at a location that is spaced apart from the left transducer and the right transducer.

25. The loudspeaker system of claim 19, comprising a soundbar with a housing, wherein the left transducer and the right transducer are contained within the housing of the soundbar.

* * * * *